United States Patent
Xu et al.

(10) Patent No.: US 8,675,499 B2
(45) Date of Patent: Mar. 18, 2014

(54) APPARATUS AND METHOD OF USER EQUIPMENT RELOCATION

(75) Inventors: Lixiang Xu, Beijing (CN); Huarui Liang, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 234 days.

(21) Appl. No.: 13/068,036

(22) Filed: Apr. 29, 2011

(65) Prior Publication Data

US 2011/0267963 A1    Nov. 3, 2011

(30) Foreign Application Priority Data

Apr. 30, 2010  (CN) .......................... 2010 1 0168697
Jun. 11, 2010  (CN) .......................... 2010 1 0200716
Jul. 26, 2010  (CN) .......................... 2010 1 0246660

(51) Int. Cl.
    *G01R 31/08* (2006.01)
(52) U.S. Cl.
    USPC ........... 370/242; 370/252; 370/328; 370/331; 455/41.2; 455/422.1; 455/435.1; 455/438
(58) Field of Classification Search
    USPC ................. 370/242, 252, 328, 331; 455/41.2, 455/422.1, 423, 435.1, 436, 438
    See application file for complete search history.

(56) References Cited

U.S. PATENT DOCUMENTS

| | | | |
|---|---|---|---|
| 5,862,345 A * | 1/1999 | Okanoue et al. .............. | 709/238 |
| 7,079,519 B2 * | 7/2006 | Lee et al. ....................... | 370/338 |
| 7,852,817 B2 * | 12/2010 | Gallagher et al. ............ | 370/338 |
| 8,005,076 B2 * | 8/2011 | Gallagher et al. ............ | 370/353 |
| 8,041,335 B2 * | 10/2011 | Khetawat et al. ........... | 455/404.2 |
| 8,335,220 B2 * | 12/2012 | Hu et al. ........................ | 370/400 |
| 2002/0150084 A1 * | 10/2002 | Lee et al. ....................... | 370/352 |
| 2007/0213060 A1 * | 9/2007 | Shaheen ........................ | 455/436 |
| 2009/0262682 A1 * | 10/2009 | Khetawat et al. ............. | 370/328 |
| 2009/0262703 A1 | 10/2009 | Khetawat et al. | |
| 2009/0265542 A1 | 10/2009 | Khetawat et al. | |
| 2009/0265543 A1 * | 10/2009 | Khetawat et al. ............. | 713/151 |
| 2010/0040023 A1 * | 2/2010 | Gallagher et al. ............ | 370/331 |
| 2010/0041387 A1 * | 2/2010 | Khetawat et al. ........... | 455/422.1 |
| 2010/0041402 A1 * | 2/2010 | Gallagher et al. ......... | 455/435.1 |
| 2010/0041403 A1 * | 2/2010 | Khetawat et al. ........... | 455/435.1 |
| 2010/0041405 A1 * | 2/2010 | Gallagher et al. ............ | 455/436 |
| 2010/0077459 A1 * | 3/2010 | Mahdi et al. ....................... | 726/4 |
| 2010/0203891 A1 * | 8/2010 | Nagaraja et al. .............. | 455/436 |

OTHER PUBLICATIONS

International Search Report dated Jan. 2, 2012 in connection with International Patent Application No. PCT/KR2011/003231.

* cited by examiner

*Primary Examiner* — Andrew Lai
*Assistant Examiner* — Andrew C Lee

(57) ABSTRACT

A method for relocating User Equipment (UE). The method includes a Source Home Node B (S-HNB) sending a Radio Access Network Application Part (RANAP) Relocation Required message and a RANAP Relocation Request message encapsulated in a RANAP User Adaptation (RUA) Direct Transfer message to an HNB gateway (HNB GW). The method also includes the HNB GW sending the RANAP Relocation Request message encapsulated in a RUA Direct Transfer message or in a RUA Connection message to a target HNB (T-HNB). The relocation method may have several advantages. For example, the HNB GW is not required to store a large amount of UE Context, thereby reducing the burden of the HNB GW. The interaction with the CN is decreased, thereby reducing the burden of the CN. The HNB GW is not required to construct RANAP relocation messages, thereby reducing the complexity of the HNB GW.

20 Claims, 12 Drawing Sheets

APPARATUS AND METHOD OF USER EQUIPMENT RELOCATION

CROSS-REFERENCE TO RELATED APPLICATION(S) AND CLAIM OF PRIORITY

The present application is related to and claims the benefit under 35 U.S.C. §119(a) to Chinese patent application filed in the Chinese Intellectual Property Office on Apr. 30, 2010 and assigned Serial No. 201010168697.5, Chinese patent application filed on Jun. 11, 2010, and assigned Serial No. 201010200716.8, and Chinese patent application filed on Jul. 26, 2010, and assigned Serial No. 201010246660.X, the entire disclosures of which are hereby incorporated by reference.

TECHNICAL FIELD OF THE INVENTION

The present invention relates to communication technology, and more particularly to an apparatus and a method of user equipment relocation.

BACKGROUND OF THE INVENTION

A home base station is a base station used in a home. A home base station includes HeNB (Home enhanced Node B) used in Long Term Evolution (LTE) system and HNB (Home Node B) used in Universal Mobile Telecommunications System (UMTS). The architecture of HNB used in UMTS is shown in FIG. 1. Referring to FIG. 1, UE is connected to HNB via an Uu interface, the HNB is connected to HNB gateway (HNB GW) via an Iuh interface, and the HNB GW is connected to Servicing General Packet Radio Service (GPRS) Support Node (SGSN) in the core network (CN) via an Iu interface.

In the UMTS, there may be various types of HNBs, such as Open Access HNB, Hybrid HNB, and Closed Subscriber Group (CSG) HNB, so as to enrich the accessing services provided to user equipment (UE). Each CSG has a unique CSG identity (ID) for identifying the CSG. The Open Access HNB has no specific accessing UE, i.e., any UE can access the Open Access HNB. The CSG HNB allows specific UE it serves (hereinafter, referred to CSG UE for convenience) to access. The Hybrid HNB allows not only a CSG UE it serves to access so as to provide better service to the CSG UE, but also the other UEs which are not CSG UEs to access.

Currently, the relocation of the UE between the HNBs connected to a same HNB GW is carried out via SGSN. However, the burden of the CN is increased by relocation with SGSN, thereby resulting degrade of the relocation performance. A method of UE relocation which has been proposed is shown in FIG. 2. Referring to FIG. 2, the method includes the following:

Block 201: UE establishes an active Circuit Switch (CS) and/or Packet Switch (PS) session to CN via a source-HNB (S-HNB) and an HNB-GW.

Block 202: The S-HNB makes a decision to relocate the UE performing the CS and/or PS session.

Block 203: The S-HNB triggers relocation of the UE by sending a RANAP (Radio Access Network Application Part) Relocation Required message encapsulated in a RUA (RANAP User Adaptation) Direct Transfer message to the HNB-GW.

In this block, a target Radio network Control (RNC) identity, target HNB (T-HNB) Cell information and relocation information are included in the RANAP Relocation Required message.

Block 204: The HNB GW determines a T-HNB, and sends a RANAP Relocation Request message encapsulated in a RUA Connection message or a RUA Direct Transfer message to the T-HNB.

In this block, the HNB GW establishes a specific UE context identity used between the HNB and the HNB GW, and CSG membership status information may be included in the RUA Connection message.

After receiving the RANAP Relocation Request message, the T-HNB processes the RANAP Relocation Request message, and allocates suitable resources for the UE to be relocated.

Block 205: The T-HNB sends a RUA Direct Transfer message with the RANAP Relocation Request Acknowledge message encapsulated therein to the HNB GW.

Block 206: The HNB GW constructs a RANAP Relocation Command message, and sends it to the S-HNB by encapsulating it in a RUA Direct Transfer message.

Block 207: The S-HNB sends a Physical Channel Reconfiguration message to the UE.

Block 208: The UE sends Uplink Synchronization information to the T-HNB.

Block 209: The T-HNB sends a RANAP Relocation Detection message encapsulated in a RUA Direct Transfer message to the HNB GW.

Block 210: The UE sends a Physical Channel Reconfiguration Complete message to the T-HNB.

Block 211: The T-HNB sends a RANAP Relocation Complete message encapsulated in a RUA Direct Transfer message to the HNB GW.

Block 212: The HNB GW constructs a RANAP Iu Release Command message, and sends the RANAP Iu Release Command message encapsulated in a RUA Direct Transfer message to the S-HNB.

Block 213: The S-HNB acknowledges the Iu release procedure by sending a RUA Disconnect message encapsulated with a RANAP Iu Release Complete message to the HNB GW.

Block 214: The HNB GW deregisters the UE from the S-HNB, and the S-HNB releases the resources allocated to the UE, and releases all context information of the UE stored therein.

In this block, the UE deregistration may be initiated by the S-HNB or by the HNB GW.

It is to be noted that, if only CS or only PS exists, blocks 202-213 will be performed once; if both CS and PS exist, blocks 202-213 will be repeated. For a specific UE, when blocks 202-213 are repeated, the UE is not reallocated with a new UE context identity. When block 204 is performed for the first time, the RANAP Relocation Request massage is sent to the T-HNB via the RUA Connection message, while when block 204 is performed again, the RANAP Relocation Request may be sent to the T-HNB via a RUA Direct Transfer message. Alternatively, when block 204 is performed again, the RANAP Relocation Request may be sent to the T-HNB via the RUA Connection message, just without reallocating the UE context identity.

Therefore, the whole procedure of the enhanced UE relocation method in prior art is completed.

It can be seen from the above procedure that, in the enhanced UE relocation method, the interaction with the CN is decreased, thereby reducing the burden of the CN. However, since the carrying information and security context information of the UE are not included in the RANAP Relocation Required message in the relocation procedure, a large amount of the context information should be stored in the HNB GW, also, the HNB GW must reconstruct information associated with the relocation in the relocation procedure, thereby increasing the complexity of the HNB GW.

In addition, the user plane data transport between the HNB and the CN may be carried out with one tunnel or two tunnels. When one tunnel is used, the user plane data transport is carried out from the HNB to the CN directly or from the CN to the HNB directly, without passing through the HNB GW. When two tunnels are used, the user plane data transport is carried out from the HNB to the HNB GW and then to CN, or from the CN to the HNB via the HNB GW. When the user plane data transport is carried out with two tunnels, the relocation procedure may be as shown in FIG. 2. When the user plane data transport is carried out with one tunnel, how to notify the CN of the change of the downlink user plane bear transport path is a problem to be solved.

Furthermore, the existing optimized relocation procedure makes all relocation signaling to be terminated at HNB GW, so as to avoid interaction with the CN. However, the T-HNB does not know whether or how to carry out the optimized relocation procedure, and thus the problems, such as quality of service (Qos) negotiation, partial Radio Access Bear (RAB) establishment failure and security algorithm selection, in the optimized relocation procedure cannot be solved.

Finally, when the UE is in a cell forward access channel (cell_FACH) state, how to support the optimized relocation procedure, how to perform access control, and how to construct a Relocation Required message by the S-HNB cannot be solved by the existing optimized relocation procedure.

SUMMARY OF THE INVENTION

To address the above-discussed deficiencies of the prior art, it is a primary object to provide methods for relocating UE, which can not only decrease the interaction with CN during the relocation procedure but also makes it unnecessary to store a large amount of UE Context information in the HNB GW. Further, the methods can reduce the complexity of the HNB GW, and can notify the CN the change of the downlink user plane bear transport path. In addition, the methods can solve the problems of Qos guarantee negotiation, partial bearer establishment failure, security algorithms selection, and mobility of the UE in a Cell_FACH state during the relocation procedure.

To achieve the above object, the solution provide by the present invention are as follows.

An embodiment provides a method for relocating User Equipment (UE). The method includes a Source Home Node B (S-HNB) sending a Radio Access Network Application Part (RANAP) Relocation Required message and a RANAP Relocation Request message encapsulated in a RANAP User Adaptation (RUA) Direct Transfer message to an HNB gateway (HNB GW). The method also includes the HNB GW sending the RANAP Relocation Request message encapsulated in a RUA Direct Transfer message or in a RUA Connection message to a target HNB (T-HNB).

Preferably, after the HNB GW sending the RANAP Relocation Request message to the T-HNB, the method further includes the T-HNB sending a RANAP Relocation Request Acknowledge message encapsulated in a RUA Direct Transfer message to the HNB GW. The method also includes the HNB GW constructing a RANAP Relocation Command message, and sending the RANAP Relocation Command encapsulated in a RUA Direct Transfer message to the S-HNB.

After sending the RANAP Relocation Command to the S-HNB, the method further includes the T-HNB sending a RANAP Relocation Complete message encapsulated in a RUA Direct Transfer message to the HNB GW. The method also includes the HNB GW constructing a RANAP Iu Release Command message, and sending the RANAP Iu Release Command message encapsulated in a RUA Direct Transfer message to the S-HNB.

After the HNB GW sending the RANAP Relocation Request message to the T-HNB, the method further includes the T-HNB sending a RANAP Relocation Request Acknowledge message and a RANAP Relocation Command message to the HNB GW via a RUA Direct Transfer message. The method also includes the HNB GW sending the RANAP Relocation Command message to the S-HNB via a RUA Direct Transfer message.

After sending the RANAP Relocation Command message to the S-HNB, the method further includes the T-HNB sending a RANAP Relocation Complete message and a RANAP Iu Release Command message to the HNB GW via a RUA Direct Transfer message. The method also includes the HNB GW sending the RANAP Iu Release Command message to the S-HNB via a RUA Direct Transfer message.

After the HNB GW sending the RANAP Relocation Request message to the T-HNB, the method further includes the T-HNB sending a RANAP Relocation Request Acknowledge message or a RANAP Relocation Command message to the HNB GW via a RUA Direct Transfer message. The method also includes the HNB GW sending the RANAP Relocation Request Acknowledge message or the RANAP Relocation Command message to the S-HNB via a RUA Direct Transfer message.

After sending the RANAP Relocation Command to the S-HNB, the method further includes the T-HNB sending a RANAP Relocation Complete message or a RANAP Iu Release Command message to the HNB GW via a RUA Direct Transfer message. The method also includes the HNB GW constructing a RANAP Iu Release Command message, and sending the RANAP Iu Release Command message encapsulated in a RUA Direct Transfer message to the S-HNB, or the HNB GW sending the RANAP IuRelease Command to the S-HNB directly via a RUA Direct Transfer message.

The method according to this embodiment includes several advantages. First, since the RANAP Relocation Request information is sent by the S-HNB to the HNB GW, there is no need for the HNB GW to store a large amount of UE Context information, thereby reducing the burden of the HNB GW. Second, the interaction with CN during the relocation procedure is decreased, thereby reducing the burden of the CN.

Another embodiment provides a method for relocation User Equipment (UE) applies when the UE is in a Cell forward Access Channel (Cell_FACH) state. The method includes a Target Home Node B (T-HNB) receiving a Cell Update message from the UE. The method also includes the T-HNB sending a first UE Signaling Transfer message to the HNB Gateway (HNB GW), wherein the first UE Signaling Transfer message includes a Cell Update message.

After the T-HNB sending the first UE Signaling Transfer message to the HNB GW, the method further includes the HNB GW sending a second UE Signaling Transfer message to a Source HNB (S-HNB), wherein the second UE Signaling Transfer message includes at least one of a Cell Update message, a Location Area Identity (LAI) of the target cell where the UE is, a Route Area Code (RAC), a Cell identity of the target cell, and a Closed Subscriber Group (CSG) identity of the target cell. The method also includes the S-HNB initiating the relocation procedure of the UE by sending at least one of a Radio Access Network Application Part (RANAP) Relocation Required message and a RANAP Relocation Request message to the HNB GW.

After the HNB GW sending the second UE Signaling Transfer message to the S-HNB, and before the S-HNB sending the RANAP Relocation Required message and/or a RANAP Relocation Request message to the HNB GW, the method further includes the S-HNB performing access control of the UE according to the CSG identity of the target cell.

After the T-HNB sending the first UE Signaling Transfer message to the HNB GW, the method further includes the HNB GW performing access control of the UE according to the access mode of S-HNB cells and/or T-HNB cells.

When the access control of the UE fails, the method also includes the HNB GW sending a UE Information Transfer Failure Notification message to the T-HNB, wherein the UE Information Transfer Failure Notification message includes a Cell Update message.

When the access control of the UE succeeds, and after the HNB GW performing the access control of the UE according to the access mode of the S-HNB cells and/or the T-HNB cells, the method further includes the HNB GW sending a second UE Signaling Transfer message to the S-HNB, wherein the second UE Signaling Transfer message includes at least one of: a Cell Update message, a Location Area Identity (LAI) of the target cell where the UE is, a Route Area Code (RAC), a Cell identity of the target cell, and a Closed Subscriber Group (CSG) identity of the target cell. The method also includes the S-HNB initiating the relocation procedure of the UE by sending a Radio Access Network Application Part (RANAP) Relocation Required message and/or a RANAP Relocation Request message to the HNB GW.

The method according to this embodiment solves the mobility problem of the UE in Cell_FACH state.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
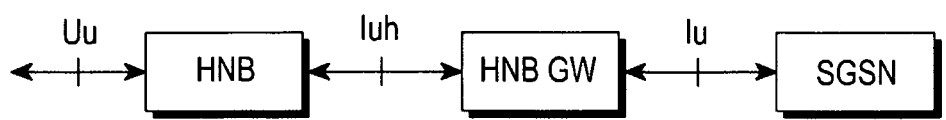
FIG. 1 is the architecture of the HNB in conventional UMTS.
Figure 2:
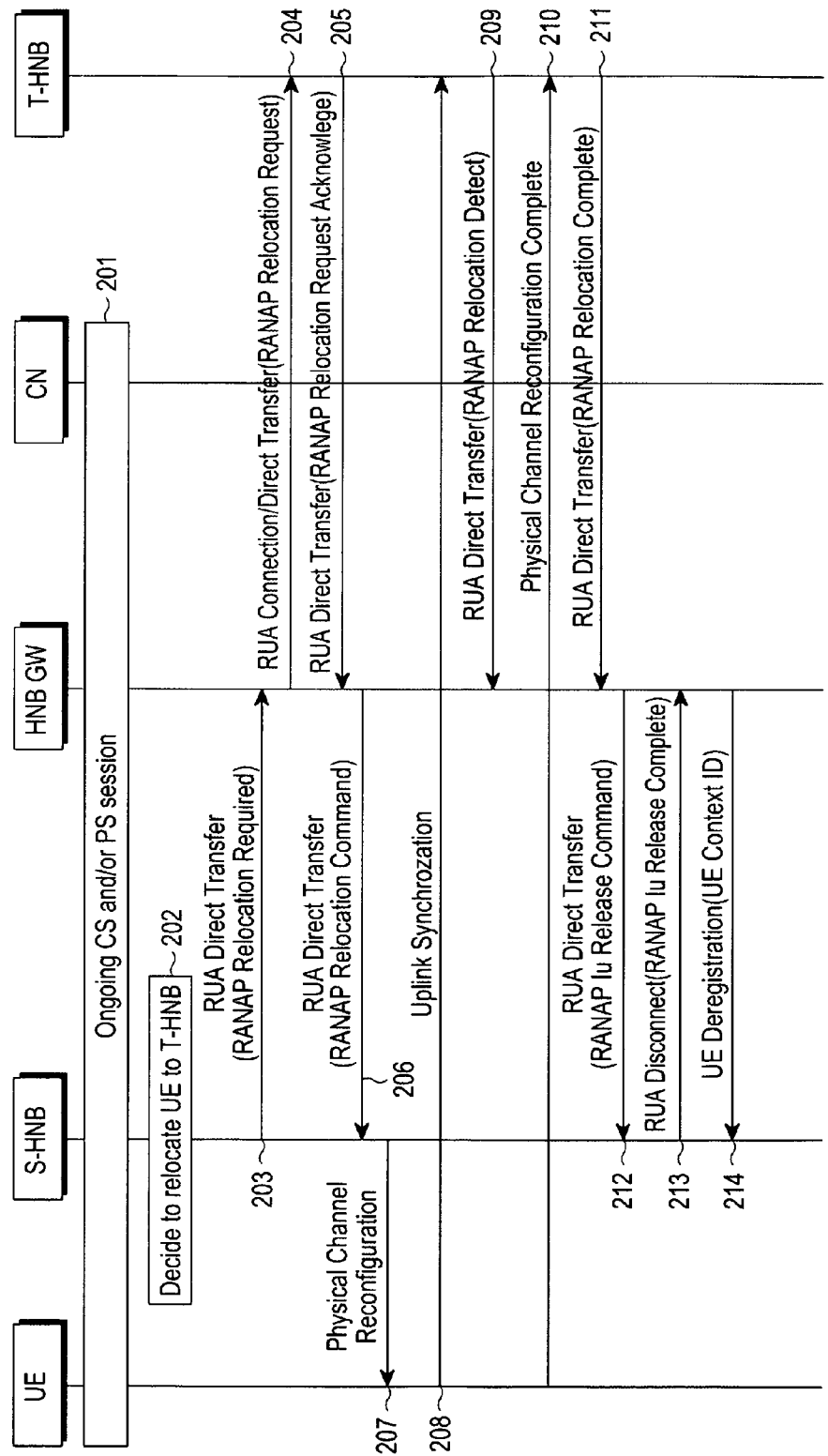
FIG. 2 illustrates a conventional enhanced UE relocation procedure.

FIGS. 3 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

To solve the problems existing in the prior art, the present invention provides a new method for relocating UE. According to an embodiment, a RANAP Relocation Request message is sent by an S-HNB to an HNB GW, so that the HNB GW is not required to store a large amount of the UE context information, thereby reducing the burden of the HNB. According to an embodiment, the interaction with the CN is decreased during the relocation procedure, thereby reducing the burden of the CN. According to an embodiment, a message associated with RANAP relocation transmitted from an HNB GW to an S-HNB is constructed by a T-HNB, so that the construction of the message associated with the RANAP relocation is not performed by the HNB GW, thereby reducing the complexity of the HNB GW. According to an embodiment, in the relocation complete stage, after receiving a Relocation Complete Request message from the T-HNB, the HNB GW sends a Relocation Complete Request message to the CN to notify the CN the change of the downlink user plane bear transport path. According to an embodiment, the indication for relocation to be terminated at the HNB GW included in the RUA Direct Transfer message or the RUA Connection message received by the T-HNB includes various optimized relocation messages, and thus the T-HNB can allocate resources by not using alternative RAB parameters, or use first the integrity protection algorithm and ciphering algorithm selected by the S-HNB, or send various optimized relocation command such as a Relocation Failure message when partial bearer establishment fails, so that the problems of Qos guarantee negotiation, partial bearer establishment failure and security algorithms selection in the optimized relocation procedure can be solved. According to an embodiment, the mobility problem of UE in Cell_FACH state can also be solved.

Before describing the detailed solution, the model that the relocation is terminated at the HNB GW is given as follows. The relocation being terminated at the HNB GW includes: the CN being not required to participate in the relocation procedure, or the CN being not required to participate in the stages of the reconfiguration preparation (preparing resources at the T-HNB) and relocation performing (UE accessing target cell), and the CN being informed when the relocation is completed, for example, informing the CN after the relocation is completed between accessing network and UE belongs to the concept that relocation being terminated at the HNB GW.

Based on the above, the solution of the present invention includes one or more of the following:

(A) An S-HNB sends a RANAP Relocation Request message encapsulated in a RUA Direct Transfer message to the HNB GW. The HNB GW sends the RANAP Relocation Request message encapsulated in a RUA Direct Transfer message or a RUA Connection message to a T-HNB.

(B) An S-HNB sends a RANAP Relocation Request message to an HNB GW via a RUA Direct Transfer message. The HNB GW forwards the RANAP Relocation Request message to a T-HNB via a RUA Connection message or a RUA Direct Transfer message. The indication for relocation to be terminated at the HNB GW is included in the RUA Connection message or the RUA Direct Transfer message.

(C) An S-HNB sends a RANAP Relocation Required message or a RANAP Relocation Request message to the HNB GW via a RUA Direct Transfer message. The HNB GW sends a RANAP Relocation Request message to a T-HNB via a RUA Direct Transfer message or a RUA Connection message. The indication for relocation to be terminated at the HNB GW is included in the RUA Direct Transfer message or the RUA Connection message. The T-HNB sends a Relocation Complete Request to the HNB GW. The T-HNB receives a Relocation Complete Response message from the HNB GW.

(D) An S-HNB sends a RANAP Relocation Required message or a RANAP Relocation Request message to an HNB GW via a RUA Direct Transfer message. The HNB GW sends the RANAP Relocation Request message to the T-HNB via a RUA Direct Transfer message or a RUA Connection message, and the indication for relocation to be terminated at the HNB GW is included in the RUA Direct Transfer message or the RUA Connection message. The T-HNB sends Relocation Request Acknowledge message to the HNB GW.

(E) When UE is in a Cell_FACH state, a T-HNB receives a Cell Update message from the UE. The T-HNB sends a first UE Signaling Transfer message to an HNB GW, and the Cell Update message is included in the first UE Signaling Transfer message.

The present invention will be described in further detail with reference to some embodiment and the attached drawings, so that the object, solution and advantages will become more apparent.

Embodiment 1

Figure 3:
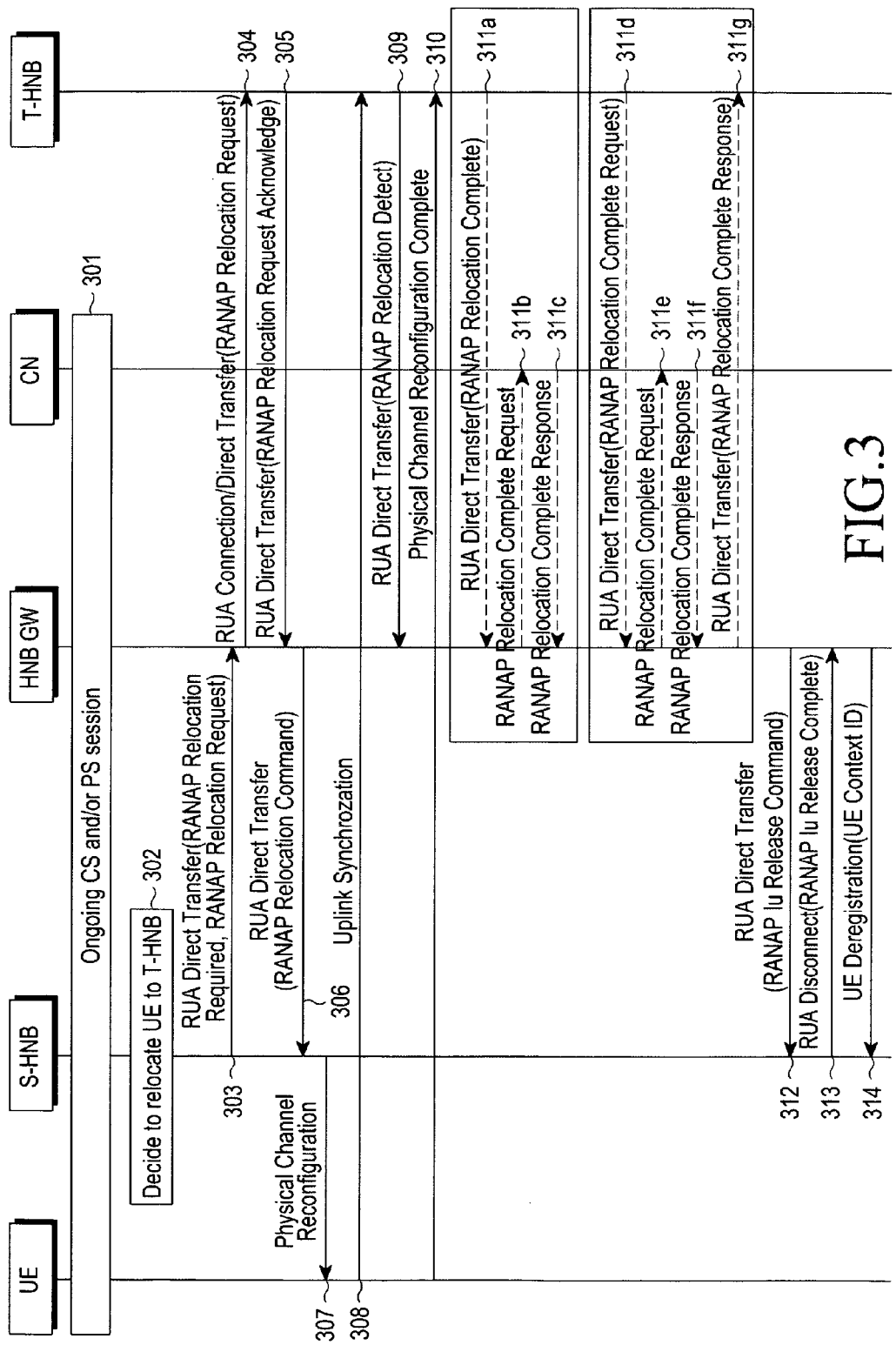
FIG. 3 illustrates a method for relocating UE according to Embodiment 1 of the present invention.

In the relocation procedure according to this embodiment, whether the relocation is to be terminated at a HNB GW is decided by an HNB GW. The flow chart illustrating the procedure is shown in FIG. 3. With reference to FIG. 3, the procedure includes the following:

Block 301: UE establishes an active CS and/or PS session to a CN via an S-HNB and an HNB-GW.

Block 302: The S-HNB makes a decision to relocate the UE performing the CS and/or PS session.

Block 303: The S-HNB triggers relocation of the UE by sending a RANAP Relocation Required message and a RANAP Relocation Request message encapsulated in a RUA Direct Transfer message to the HNB GW.

In this block, a target RNC identity, T-HNB Cell information is included in the RANAP Relocation Required message, and the S-HNB includes information of each RAB allocated by the HNB GW stored therein into the RANAP Relocation Request message.

It is to be noted that RAB data amount report information elements, which indicate the downlink data amount of each RAB that not sent successfully, are also included in the RUA Direct Transfer message.

It is also to be noted that the integrity protection algorithm selected by the S-HNB may be included in the RUA Direct Transfer message, and the ciphering algorithm selected by the S-HNB may also be included in the RUA Direct Transfer message.

Block 304: After receiving the RANAP Relocation Required message and the RANAP Relocation Request message, the HNB GW determines a T-HNB, and sends a RANAP Relocation Request message encapsulated in a RUA Direct Transfer message or a RUA Connection message to the T-HNB.

It is to be noted that, in this block, if it is the first communication between the HNB GW and the T-HNB (Iu interface UE context ID is not allocated), a RUA Connection message is not sent to the T-HNB. If it is not the first communication between the HNB GW and the T-HNB (Iu interface UE context ID is already allocated), either the RUA Connection message or the RUA Direct Transfer message can be sent.

Indication information for the relocation to be terminated at HNB GW may also be included in the RUA Connection/Direct Transfer message sent to the T-HNB. Information about whether the UE user plane transport employs one tunnel or two tunnels may be also included in the RUA Connection/Direct Transfer message.

It is also to be noted that, in this block, after deciding the T-HNB, the HNB GW further decides whether the relocation is to be terminated at HNB GW or further to CN. The RUA Direct Transfer message or RUA Connection message is sent to the T-HNB when the relocation is to be terminated at HNB GW.

The relocation is to be terminated at HNB GW if the relocation is under a same HNB GW in a same CSG. For example, under a same HNB GW, if the T-HNB cell is an Open Access HNB or a Hybrid HNB, the relocation is to be terminated at HNB GW. For example, if the relocation is under a same HNB GW in a same CSG, and the user plane data transport of the UE employs two tunnels, the relocation is to be terminated at HNB GW. When the HNB GW decides that the relocation is to be carried out with the participating of the CN, the HNB GW sends the RANAP Relocation Required message received from the S-HNB to the CN. The HNB GW may determine whether the relocation is under a same GW in a same CSG according to the CSG identity and RNC identity of the T-HNB Cell included in the RANAP Relocation Required message.

In addition, RAB data amount report information elements, indicating the downlink data amount of each RAB not sent successfully, may be also included in the RUA Direct Transfer message or the RUA Connection message. The T-HNB accumulates the received downlink data amount not sent successfully. When the UE session is released, the accumulated final downlink data amount of the corresponding RAB not successfully sent is sent to the GW by the T-HNB, and then sent to the CN by the GW. It is to be noted that the HNB GW sends the selected integrity protection algorithm received from the S-HNB to the T-HNB via the RUA Direct Transfer message or the RUA Connection message, and the selected ciphering algorithm may be also included in the RUA message.

For the method of the relocation which does not need the participating of the CN (block 311 is Method 1), the T-HNB also performs as follows.

The T-HNB allocates resources using the RAB parameters included in the Relocation Request message according to the indication for relocation to be terminated at HNB GW received from the HNB GW. Even though the received Relocation Request message also includes some alternative RAB parameters of RAB, the T-HNB does not use the alternative RAB parameters to allocate the resources. If the allocation of the resources according to the RAB parameters is not successful, the T-HNB sends a Relocation Failure message to the HNB GW. The T-HNB may include the cause of the failure (RAB parameter resource not allowed) in the Relocation Failure message, and send it to the HNB GW. If there are alternative RAB parameters, the HNB GW may send a Relocation Required message to the CN (to initiate the relocation that uses the participating of the CN). Or, the HNB GW terminates the present relocation procedure by sending a Relocation Preparation Failure message including the cause value which is the same as that of the relocation failure to the S-HNB. Optionally, the S-HNB may initiate a relocation procedure that uses the participating of the CN.

If the resource is allocated successfully, the T-HNB, after the relocation is completed, may initiate a procedure to amend the RAB to the CN to modify the Qos parameter.

As a solution (Method 1) of partial RAB being not established successfully, according to the indication for relocation to be terminated at the HNB GW received from the HNB GW, the T-HNB sends a Relocation Failure message to the HNB GW when partial RAB is not established successfully. The T-HNB may include the cause of the failure (partial bearer establishment fails) in the Relocation Failure message and send it to the HNB GW. The HNB GW may send a Relocation Required message to the CN (to initiate relocation procedure with the participating of the CN), or the HNB GW may terminate the present relocation procedure by sending a Relocation Preparation Failure message including cause value which is the same as that of the relocation failure to the S-HNB. Optionally, the relocation which uses the participating of the CN may be initiated by the S-HNB.

As another solution (Method 2) of partial RAB being not established successfully, the T-HNB sends the Relocation Request Acknowledge message in block 305 to the HNB GW via RUA Direct Transfer message, even though partial bearer establishment fails. According to the indication for relocation to be terminated at the HNB GW, the T-HNB initiates RAB Release procedure to the CN. The T-HNB sends a RAB Release Request message to the HNB GW. The other procedure of the RAB Release is the same as the prior art, and will not be described in detail herein.

As another solution (Method 3) of partial RAB being not established successfully, the T-HNB sends the Relocation Request Acknowledge message in block 305 to the HNB GW via RUA Direct Transfer message, even though partial bearer establishment fails. The HNB GW knows information about the RAB not established successfully according to the Relocation Request Acknowledge message, and initiates RAB release procedure to the CN. The HNB GW sends a RAB Release Request message to the HNB GW. The other procedure of the RAB Release is the same as the prior art, and will not be described in detail herein.

As another solution (Method 4) of partial RAB being not established successfully, the T-HNB sends the Relocation Request Acknowledge message in block 305 to the HNB GW via RUA Direct Transfer message, even though partial bearer establishment fails. The HNB GW knows information about the RAB not established successfully according to the Relocation Request Acknowledge message. The HNB GW may send a Relocation Required message to the CN (to initiate a relocation procedure with the participating of the CN), or the HNB GW may terminate the present relocation procedure by sending a Relocation Preparation Failure message including a cause value which is the same as that of the relocation failure to the S-HNB. Optionally, the relocation which uses the participating of the CN may be initiated by the S-HNB.

According to the indication for relocation to be terminated at the HNB GW received from the HNB GW, if ciphering algorithm or integrity protection algorithm selected by the S-HNB is included in the Relocation Request message received by the T-HNB and supported by the T-HNB, the algorithms may be used by the T-HNB first. If ciphering algorithm or integrity protection algorithm selected by the S-HNB is not included in the Relocation Request message received by the T-HNB or not supported by the T-HNB, the T-HNB selects new algorithms according to the algorithms supported by it and allowed by the Relocation Request message.

Block 305: The T-HNB sends a RUA Direct Transfer message with the RANAP Relocation Request Acknowledge message encapsulated therein to the HNB GW.

Block 306: The HNB GW constructs a RANAP Relocation Command message, and sends it to the S-HNB by encapsulating it in a RUA Direct Transfer message.

Block 307: The S-HNB sends a Physical Channel Reconfiguration message to the UE.

Block 308: The UE sends Uplink Synchronization information to the T-HNB.

Block 309: The T-HNB sends a RANAP Relocation Detection message encapsulated in a RUA Direct Transfer message to the HNB GW.

This block is optional, and may be omitted in this embodiment.

Block 310: The UE sends a Physical Channel Reconfiguration Complete message to the T-HNB.

Block 311 may be implemented by the following scheme:
Scheme 1:
Block 311a: The T-HNB sends a RANAP Relocation Complete message encapsulated in a RUA Direct Transfer message to the HNB GW.

For example, this scheme may be used when the user plane transport between the HNB and the CN employs two tunnels, or the HNB GW decides that the relocation is to be terminated at HNB GW when the user plane transport between the HNB and the CN for the UE employs two tunnels.

Scheme 2:
Block 311a: The T-HNB sends the RANAP Relocation Complete message encapsulated in a RUA Direct Transfer message to the HNB GW.

Block 311b: The HNB GW sends a RANAP Relocation Complete Request message to the CN, when the relocation is to be terminated at HNB GW, or when the relocation is to be terminated at HNB GW and one tunnel is used for UE user plane data transport. The message includes new downlink user plane information. The downlink user plane information includes established RAB list. Each piece of RAB information includes a RAB identity, transport layer address and IU transport relationship. The RAB information also includes allocated RAB parameter values. The RANAP Relocation Complete Request message also includes information elements selected integrity protection algorithm and selected encryption algorithm. The HNB GW obtains the new downlink user plane information, the selected integrity protection algorithm, and selected ciphering algorithm in block 305. The new downlink user plane information is optional, and may be included when the UE user plane transport employs one tunnel, or may be included when the UE user plane transport employs one tunnel or two tunnels. When the user plane transport employs two tunnels, the RAN information established successfully at the target HNB is told to CN, for example, the RAB which is implied as being not successfully established in the established RAB information is not contained.

Block 311*c*: The CN sends a RANAP Relocation Complete Response message to the HNB GW, and the RAB information established successfully and RAN information to be released are included in the RANAP Relocation Complete Response message.

This block is to be carried out when block 311*b* is carried out.

The procedure of RANAP Relocation Complete Request/Response in blocks 311*b* and 311*c* may be a procedure of existing enhanced relocation complete request/response or may be new RANAP procedure.

Scheme 3:

The T-HNB sends a message according to whether the relocation is to be terminated at HNB GW. The T-HNB knows whether the relocation uses the participating of the CN or the relocation is to be terminated at HNB GW according to the RUA Connection/Direct Transfer message in block 304. When the relocation uses the participating of the CN, the T-HNB performs block 311*a*, sending the RANAP Relocation Complete message to the GW via the RUA Direct Transfer message, and then performs block 312. When the relocation is to be terminated at HNB GW, the following blocks may be performed.

Block 311*d*: The T-HNB sends a RANAP Relocation Complete Request message to the HNB GW via a RUA Direct Transfer message. The RANAP Relocation Complete Request message includes new downlink user plane information. The downlink user plane information includes established RAB lists, and each piece of the RAB information include a RAB identity, transport layer address, and Iu transport relationship, and the RAB information also includes RAB parameters allocated. The RANAP Relocation Complete Request message also includes information elements selected integrity protection algorithm and selected encryption algorithm. The new downlink user plane information is optional, and may be included when the UE user plane transport employs one tunnel, or may be included when the UE user plane transport employs one tunnel or two tunnels. When the user plane transport employs two tunnels, the RAB information established successfully at the target HNB is told to the CN, for example, the RAB which is implied as being not successfully established in the established RAB information is not contained.

Block 311*e*: The HNB GW sends a RANAP Relocation Complete Request message to the CN, the information elements included in this message are the same as those of the RANAP message in block 311*d*.

Block 311*f*: The CN sends a RANAP Relocation Complete Response message including RAB information established successfully and RAB information to be released to the HNB GW.

Block 311*g*: The HNB GW sends a RANAP Relocation Complete Response message to the T-HNB via a RUA Direct Transfer message, and the information elements included in this message are the same as those of the RANAP message in block 311*f*.

The procedure in blocks 311*d* to 311*g* may be a procedure of existing enhanced relocation complete request/response or may be new RANAP procedure.

Scheme 4:

The T-HNB sends a message according to whether the relocation is to be terminated at the HNB GW and the user plane transport manner of the UE. The T-HNB knows whether the relocation uses the participating of the UE or the relocation is to be terminated at the HNB GW, and knows whether the user plane transport of the UE employs one tunnel or two tunnels, according to the RUA Connection/Direct Transfer in block 304. The T-HNB performs block 311*a*, sending the RANAP Relocation Complete message to the GW via the RUA Direct Transfer message, when the relocation uses the participating of the UE, or when the relocation is to be terminated at HNB GW but the user plane transport of the UE employs two tunnels. When the relocation is to be terminated at HNB GW, and user plane transport employs two tunnels, the T-HNB may use the integrity protection algorithm and the ciphering algorithm selected by the S-HNB. When the relocation is to be terminated at HNB GW and the user plane transport of the UE employs one tunnel, blocks 311*d* to 311*g* is performed, the detailed implementation is the same as that in Scheme 3, and will not be repeated herein.

Scheme 5:

The T-HNB sends a message according to whether the relocation is to be terminated at the HNB GW and the user plane transport manner of the UE. The T-HNB knows whether the relocation uses the participating of the UE or the relocation is to be terminated at the HNB GW, and knows whether the user plane transport of the UE employs one tunnel or two tunnels, according to the RUA Connection/Direct Transfer in block 304. The T-HNB performs block 311*a*, sending the RANAP Relocation Complete message to the GW via the RUA Direct Transfer message, when the relocation uses the participating of the UE, or when the relocation is to be terminated at HNB GW but the user plane transport of the UE employs two tunnels and integrity protection algorithm and ciphering protection information are not included in the Relocation Request message. When the relocation is to be terminated at HNB GW, and user plane transport employs two tunnels, and integrity protection algorithm and ciphering protection information are included in the Relocation Request message, the T-HNB selects security algorithm and ciphering algorithm, and performs blocks 311*d* to 311*g*, the implementation of which is the same as that in Scheme 3 and will not be repeated herein. When the relocation is to be terminated at HNB GW and the user plane transport of the UE employs one tunnel, blocks 311*d* to 311*g* are performed, the implementation is the same as that in Scheme 3, and will not be repeated herein.

Block 312: The HNB GW constructs a RANAP Iu Release Command message, and sends the RANAP Iu Release Command message encapsulated in a RUA Direct Transfer message to the S-HNB.

Block 313: The S-HNB acknowledges the Iu release procedure by sending a RUA Disconnect message encapsulated with a RANAP Iu Release Complete message to the HNB GW.

Block 314: The HNB GW deregisters the UE from the S-HNB, and the S-HNB releases the resources allocated to the UE, and releases all context information of the UE stored therein.

In this block, the UE deregistration may be initiated by the S-HNB or by the HNB GW.

It is to be noted that, if only CS or only PS exists, blocks 302-313 will be performed once; if both CS and PS exist, blocks 302-313 will be repeated. For a specific UE, when blocks 302-313 are repeated, the UE is not reallocated with a new UE context identity.

Thus, the method for relocating the UE according to this embodiment is completed. It can be seen from the above procedure that, in this embodiment, during the relocation procedure, the S-HNB sends to the HNB GW the RANAP Relocation Required message and the RANAP Relocation Request message, and the HNB GW makes a decision of whether the relocation is to be terminated at HNB GW, and when the relocation is to be terminated at the HNB GW, the HNB GW sends the Relocation Request message to the T-HNB, so that the HNB GW is not required to store a large amount of the UE context information, thereby reducing the burden of the UE. In addition, in this embodiment, when the relocation is to be terminated at the HNB GW, the relocation preparation and performing is carried out without the participating of the CN, thereby reducing the burden of the CN.

Embodiment 2

Figure 4:
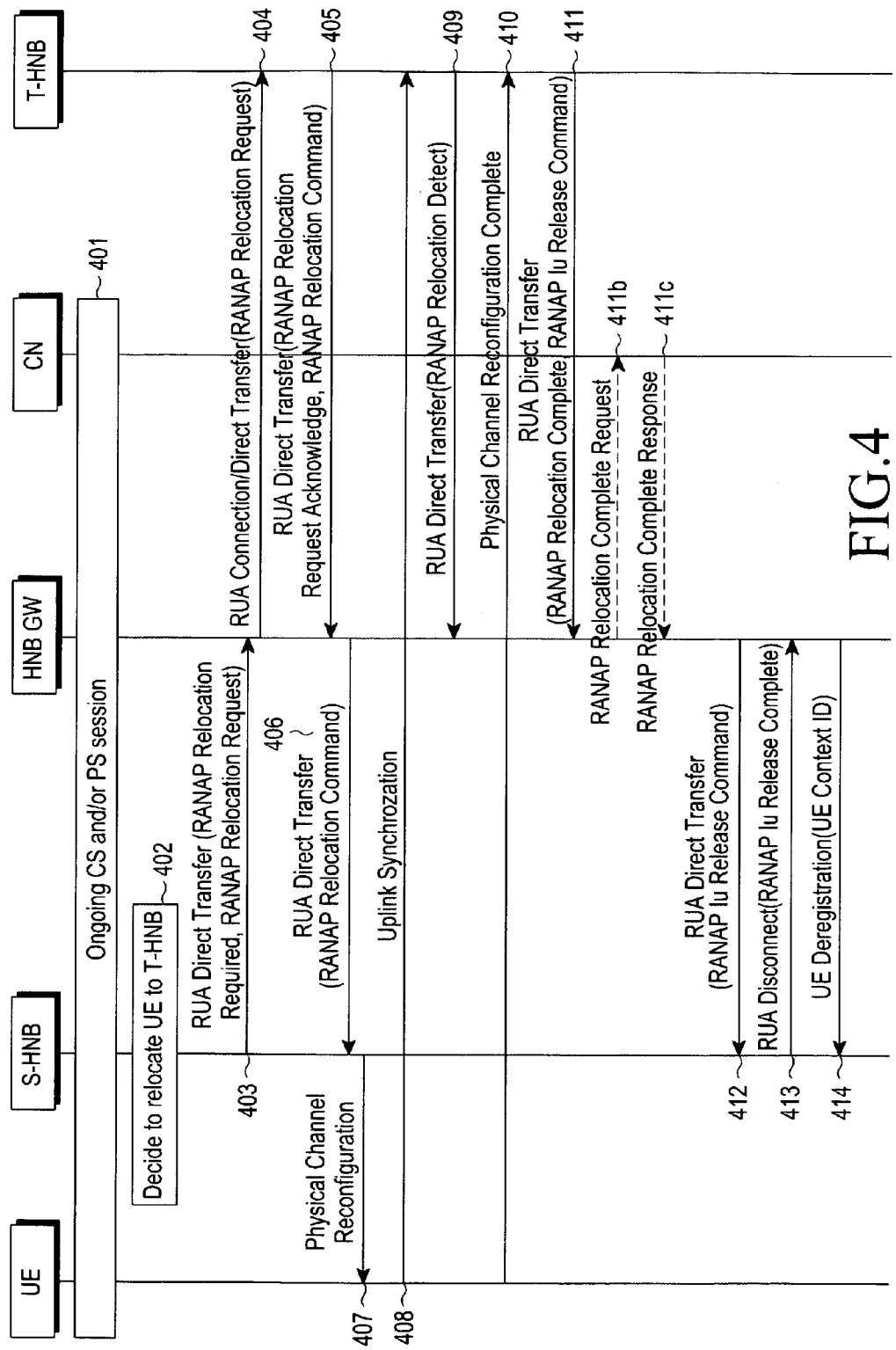
FIG. 4 illustrates a method for relocating UE according to Embodiment 2 of the present invention.

Similar to Embodiment 1, in this embodiment, whether the relocation is to be terminated at HNB GW is decided by the HNB GW. The procedure according to this embodiment is shown in FIG. 4. With reference to FIG. 4, the procedure includes the following.

Blocks 401-404 are the same as blocks 301-304 respectively, and will not be repeated herein.

Block 405: The T-HNB sends a RANAP Relocation Request Acknowledge message and a RANAP Relocation Command message to the HNB GW via a RUA Direct Transfer message.

Block 406: HNB GW sends the RANAP Relocation Command message to the S-HNB via a RUA Direct Transfer message.

Blocks 407-410 are the same as blocks 307-310 respectively, and will not be repeated herein.

Block 411: The T-HNB sends a RANAP Relocation Complete message and a RANAP Iu Release Command message to the HNB GW via a RUA Direct Transfer message.

Block 411b: The HNB GW sends a RANAP Relocation Complete Request message to the CN, when the relocation is to be terminated at HNB GW, or when the relocation is to be terminated at HNB GW and one tunnel is used for UE plane data transport. The information elements included in the message and the usage of the message are the same as those in block 311b, and will not be repeated herein.

Block 411c: The CN sends a RANAP Relocation Complete Response message to the HNB GW, and the RANAP Relocation Complete Response message includes RAN information established successfully and RAN information to be released.

This block is to be carried out when block 411b is carried out.

The procedure of blocks 411b and 411c may be existing enhanced relocation complete request/response procedure or may be a new RANAP procedure.

Block 412: The HNB GW sends the RANAP Iu Release Command message to the S-HNB via a RUA Direct Transfer message.

Blocks 413 and 414 are the same as blocks 313 and 314 respectively, and will not be repeated.

Thus, the method for relocating the UE according to this embodiment is completed. It can be seen from the above procedure that, besides the advantages of Embodiment 1, according to this embodiment, the HNB GW is not required to construct messages in blocks 406 and 412, thereby reducing the burden of the HNB GW.

Embodiment 3

Figure 5:
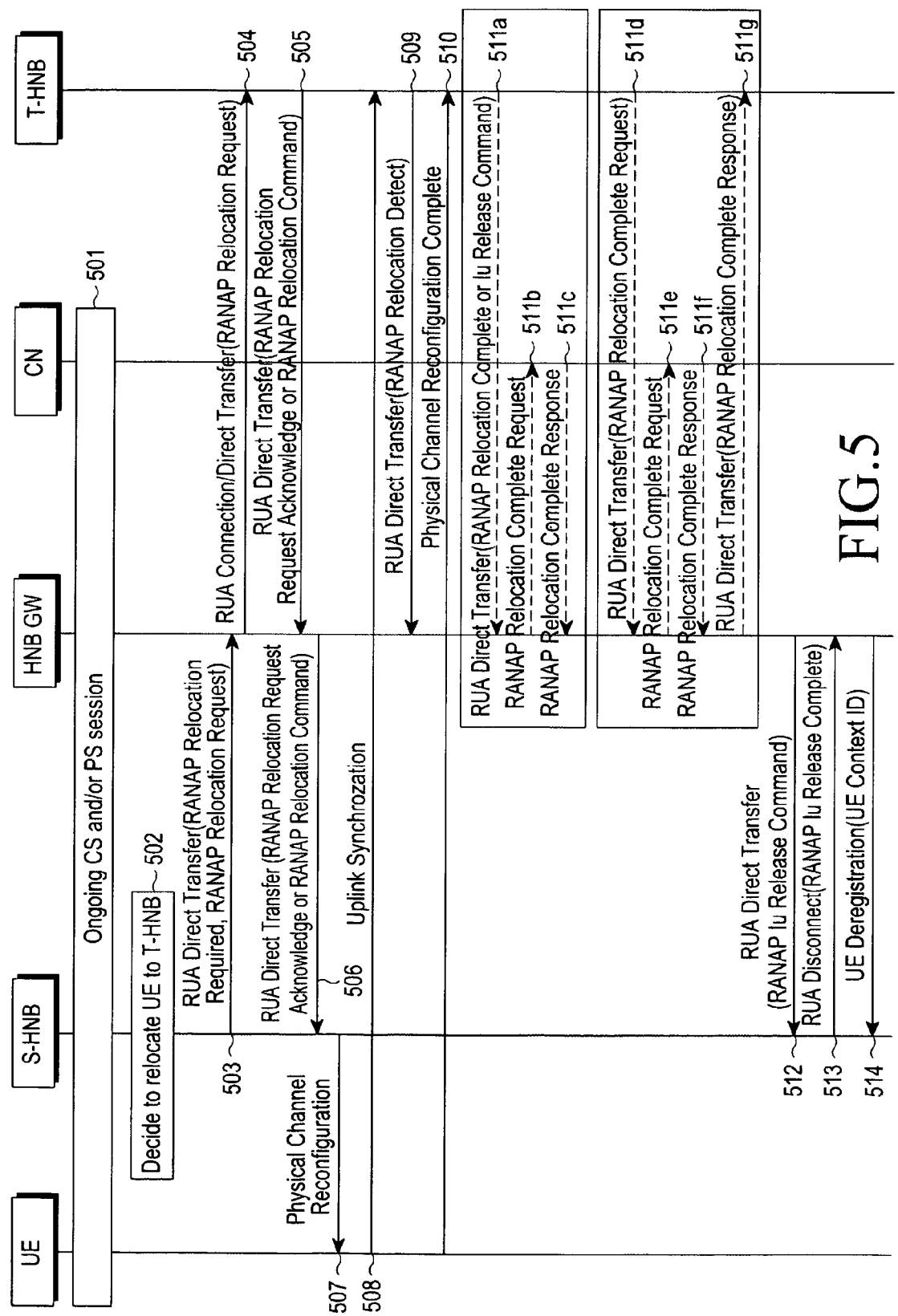
FIG. 5 illustrates a method for relocating UE according to Embodiment 3 of the present invention.

Similar to Embodiment 1 and Embodiment 2, in this embodiment, whether the relocation is to be terminated at HNB GW is decided by the HNB GW. The procedure according to this embodiment is shown in FIG. 5. With reference to FIG. 5, the procedure includes the following.

Blocks 501-504 are the same as blocks 301-304 respectively, and will not be repeated herein.

Block 505: The T-HNB sends a RANAP Relocation Request Acknowledge message to the HNB GW via a RUA Direct Transfer message, or the T-HNB sends a RANAP Relocation Command message to the HNB GW via a RUA Direct Transfer message according to the indication for relocation to be terminated at HNB GW received in block 504.

Block 506: HNB GW sends the received RANAP Relocation Request Acknowledge message or the RANAP Relocation Command message to the S-HNB via a RUA Direct Transfer message.

Blocks 507-510 are the same as blocks 307-310 respectively, and will not be repeated herein.

Block 511 may be carried out by the following schemes:
Scheme 1

Block 511a: The T-HNB sends a RANAP Relocation Complete message or an Iu Release Command message encapsulated in a RUA Direct Transfer message to the HNB GW.

For example, this scheme may be used when the user plane transport between the HNB and the CN employs two tunnels, or the HNB GW decides that the relocation is to be terminated at HNB GW when the user plane transport between the HNB and the CN for the UE employs two tunnels.

Scheme 2:

Block 511a: The T-HNB sends the RANAP Relocation Complete message or the Iu Release Command message encapsulated in a RUA Direct Transfer message to the HNB GW.

Block 511b: The HNB GW sends a RANAP Relocation Complete Request message to the CN, when the relocation is to be terminated at HNB GW, or when the relocation is to be terminated at HNB GW and one tunnel is used for UE plane data transport. The message includes new downlink user plane information. The downlink user plane information includes established RAB list. Each piece of RAB information includes a RAB identity, transport layer address and Iu transport relationship. The RAB information also includes allocated RAB parameter values. The RANAP Relocation Complete Request message also includes information elements selected integrity protection algorithm and selected encryption algorithm. The HNB GW obtains the new downlink user plane information, the selected integrity protection algorithm, and selected ciphering algorithm in block 505. The new downlink user plane information is optional, and may be included when the UE user plane transport employs one tunnel, or may be included when the UE user plane transport employs one tunnel or two tunnels. When the user plane transport employs two tunnels, the RAN information established successfully at the target HNB is told to CN, for example, the RAB which is implied as being not successfully established in the established RAB information is not contained.

Block 511c: The CN sends a RANAP Relocation Complete Response message to the HNB GW, and the RAB information established successfully and RAN information to be released are included in the RANAP Relocation Complete Response message. This block is to be carried out when block 511b is carried out.

The procedure of RANAP Relocation Complete Request/Response in blocks 511b and 511c may be a procedure of existing enhanced relocation complete request/response or may be new RANAP procedure.

Scheme 3:

The T-HNB sends a message according to whether the relocation is to be terminated at HNB GW. The T-HNB knows whether the relocation uses the participating of the CN or the relocation is to be terminated at HNB GW according to the RUA Connection/Direct Transfer message in block 504. When the relocation uses the participating of the CN, the T-HNB performs block 511a, sending the RANAP Relocation Complete message to the GW via the RUA Direct Transfer message, and then performs block 512. When the relocation is to be terminated at HNB GW, the following blocks may be performed.

Block 511a: The T-HNB sends a RANAP Iu Release Command message to the HNB GW via a RUA Direct Transfer message. This block is optional, and may be or may be not performed in Scheme 3.

Block 511d: The T-HNB sends a RANAP Relocation Complete Request message to the HNB GW via a RUA Direct Transfer message. The RANAP Relocation Complete Request message includes new downlink user plane information. The downlink user plane information includes established RAB lists, and each piece of the RAB information includes a RAB identity, transport layer address, and Iu transport relationship, and the RAB information also includes RAB parameters allocated. The RANAP Relocation Complete Request message also includes information elements, selected integrity protection algorithm, and selected ciphering algorithm. The new downlink user plane information is optional, and may be included when the UE user plane transport employs one tunnel, or may be included when the UE user plane transport employs one tunnel or two tunnels. When the user plane transport employs two tunnels, the RAB information established successfully at the target HNB is told to the CN, for example, the RAB which is implied as being not successfully established in the established RAB information is not contained.

Block 511e: The HNB GW sends a RANAP Relocation Complete Request message to the CN, and the information elements included in this message are the same as those of the RANAP message in block 511d.

Block 511f: The CN sends a RANAP Relocation Complete Response message including RAB information established successfully and RAB information to be released to the HNB GW.

Block 511g: The HNB GW sends a RANAP Relocation Complete Response message to the T-HNB via a RUA Direct Transfer message, and the information elements included in this message are the same as those of the RANAP message in block 511f.

The procedure in blocks 511d to 511g may be a procedure of existing enhanced relocation complete request/response or may be new RANAP procedure.

Scheme 4:

The T-HNB sends a message according to whether the relocation is to be terminated at the HNB GW and the user plane transport manner of the UE. The T-HNB knows whether the relocation uses the participating of the UE or the relocation is to be terminated at the HNB GW, and knows whether the user plane transport of the UE employs one tunnel or two tunnels, according to the RUA Connection/Direct Transfer message in block 504. The T-HNB performs block 511a, sending the RANAP Relocation Complete message to the GW via the RUA Direct Transfer message, when the relocation uses the participating of the UE, or when the relocation is to be terminated at HNB GW but the user plane transport of the UE employs two tunnels. When the relocation is to be terminated at HNB GW, and user plane transport employs two tunnels, the T-HNB may use the integrity protection algorithm and the ciphering algorithm selected by the S-HNB. When the relocation is to be terminated at HNB GW and the user plane transport of the UE employs one tunnel, blocks 511d to 511g are performed, the detailed implementation is the same as that in Scheme 3, and will not be repeated herein.

Scheme 5:

The T-HNB sends a message according to whether the relocation is to be terminated at the HNB GW and the user plane transport manner of the UE. The T-HNB knows whether the relocation uses the participating of the UE or the relocation is to be terminated at the HNB GW, and knows whether the user plane transport of the UE employs one tunnel or two tunnels, according to the RUA Connection/Direct Transfer message in block 504. The T-HNB performs block 511a, sending the RANAP Relocation Complete message to the GW via the RUA Direct Transfer message, when the relocation uses the participating of the UE, or when the relocation is to be terminated at HNB GW but the user plane transport of the UE employs two tunnels and integrity protection algorithm and ciphering protection information are not included in the Relocation Request message. When the relocation is to be terminated at HNB GW, and user plane transport employs two tunnels, and integrity protection algorithm and ciphering protection information are included in the Relocation Request message, the T-HNB selects the security algorithm and ciphering algorithm, and performs blocks 511d to 511g, the implementation of which is the same as that in Scheme 3 and will not be repeated herein. When the relocation is to be terminated at HNB GW and the user plane transport of the UE employs one tunnel, blocks 511a and blocks 511d to 511g are performed, the implementation is the same as that in Scheme 3, and will not be repeated herein.

Block 512: When the HNB GW receives the RANAP Relocation Complete Response message, the HNB GW constructs a RANAP Iu Release Command message, and sends the RANAP Iu Release Command message to the S-HNB by encapsulating it in a RUA Direct Transfer message, or when the HNB GW receives the RANAP Iu Release Command message, the HNB GW sends the RANAP Iu Release Command message to the S-HNB directly via a RUA Direct Transfer message.

Blocks 513 and 514 are the same as blocks 313 and 314 respectively, and will not be repeated.

Thus, the method for relocating the UE according to this embodiment is completed.

Embodiment 4

Figure 6:
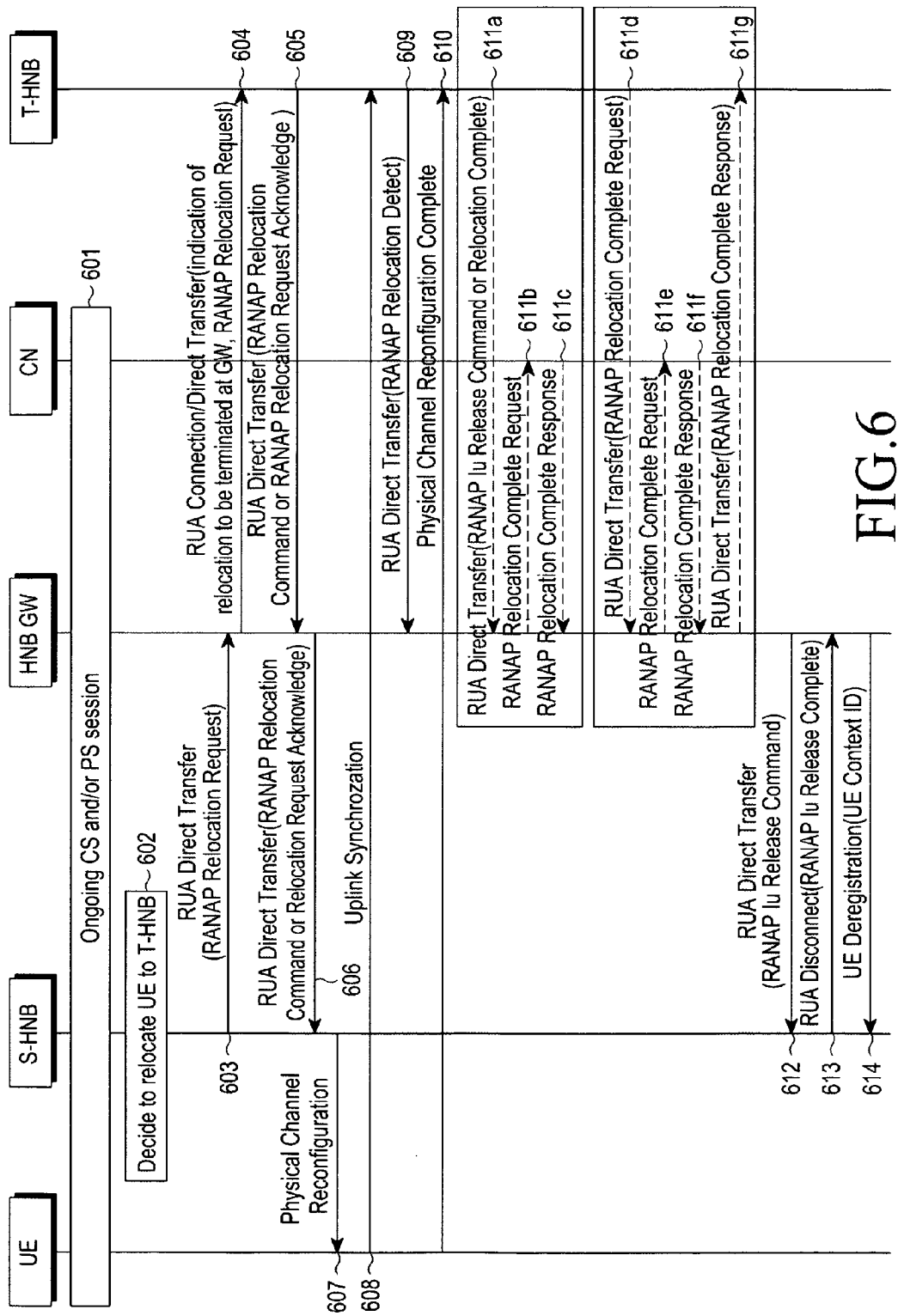
FIG. 6 illustrates a method for relocating UE according to Embodiment 4 of the present invention.

Different from Embodiments 1, 2 and 3, in this embodiment, whether the relocation is to be terminated at HNB GW is decided by the S-HNB. For example, the relocation is to be terminated at HNB GW when the UE is to be relocated between HNBs under a same HNB GW in a same CSG. Or, the relocation is to be terminated at HNB GW when the UE moves to an Open Access cell or Hybrid Cell under a same GW. Whether the relocation is under a same HNB GW in a same CSG may be determined by the S-HNB according to the CSG identity and target RNC identity of the T-HNB cell. The procedure of the method according to this embodiment is shown in FIG. 6. With reference to FIG. 6, the procedure includes the following.

Blocks 601-602 are the same as blocks 301-302.

Block 603: The S-HNB sends a RANAP Relocation Request message to the HNB GW via a RUA Direct Transfer message, when the relocation is to be terminated at HNB GW.

It is to be noted that RAB data amount report information elements, indicating downlink data amount of each RAB not successfully sent by the S-HNB, are further included in the RUA Direct Transfer message.

It is to be noted that an integrity protection algorithm selected by the S-HNB may be included in the RUA Direct Transfer message, and a ciphering algorithm selected by the S-HNB may also be included in the RUA Direct Transfer message.

Block 604: The HNB GW forwards the RANAP Relocation Request message to a T-HNB via a RUA Connection message or a RUA Direct Transfer message, and the indication for relocation to be terminated at the HNB GW is included in the RUA Connection message or the RUA Direct Transfer message. Information about whether the user plane transport of the UE employs one tunnel or two tunnels may be also included in the RUA Connection message or the RUA Direct Transfer message.

It is to be noted that RAB data amount report information elements, indicating the downlink data amount of each RAB not sent successfully, may be also included in the RUA Direct Transfer message or the RUA Connection message. The T-HNB accumulates the received downlink data amount not sent successfully. When the UE session is released, the accumulated final downlink data amount of the corresponding RAB not successfully sent is sent to the GW by the T-HNB, and then sent to the CN by the GW.

It is also to be noted that the HNB GW sends the selected integrity protection algorithm received from the S-HNB to the T-HNB via the RUA Direct Transfer message or the RUA Connection message, and the selected ciphering algorithm may be also included in the RUA message.

For the method of the relocation which does not need the participating of the CN (block 611 is the first method), the T-HNB also performs as follows:

The T-HNB allocates resources using the RAB parameters included in the Relocation Request message according to the indication for relocation to be terminated at HNB GW received from the HNB GW. Even though the received Relocation Request message also includes some alternative RAB parameters of RAB, the T-HNB does not use the alternative RAB parameters to allocate the resources. If the allocation of the resources according to the RAB parameters is not successful, the T-HNB sends a Relocation Failure message to the HNB GW. The T-HNB may include the cause of the failure (RAB parameter resource not allowed) in the Relocation Failure message, and sends it to the HNB GW. If there are alternative RAB parameters, the HNB GW may send a Relocation Required message to the CN (to initiate the relocation that uses the participating of the CN). Or, the HNB GW terminates the present relocation procedure by sending a Relocation Preparation Failure message including the cause value which is the same as that of the relocation failure to the S-HNB. Optionally, the S-HNB may initiate a relocation procedure that uses the participating of the CN.

If the resource is allocated successfully, the T-HNB, after the relocation is completed, may initiate a procedure to amend the RAB to the CN to modify the Qos parameter.

As a solution (Method 1) of partial RAB being not established successfully, according to the indication for relocation to be terminated at the HNB GW received from the HNB GW, the T-HNB sends a Relocation Failure message to the HNB GW when partial RAB is not established successfully. The T-HNB may include the cause of the failure (partial bearer establishment fails) in the Relocation Failure message and send it to the HNB GW. The HNB GW may send a Relocation Required to the CN (to initiate relocation procedure with the participating of the CN), or the HNB GW may terminate the present relocation procedure by sending a Relocation Preparation Failure message including cause value which is the same as that of the relocation failure to the S-HNB. Optionally, the relocation which uses the participating of the CN may be initiated by the S-HNB.

As another solution (Method 2) of partial RAB being not established successfully, the T-HNB sends the Relocation Request Acknowledge message in block 605 to the HNB GW via RUA Direct Transfer message, even though partial bearer establishment fails. According to the indication for relocation to be terminated at the HNB GW, the T-HNB initiates RAB Release procedure to the CN. The T-HNB sends a RAB Release Request message to the HNB GW. The other procedure of the RAB Release is the same as the prior art, and will not be described in detail herein.

As another solution (Method 3) of partial RAB being not established successfully, the T-HNB sends the Relocation Request Acknowledge message in block 605 to the HNB GW via RUA Direct Transfer message, even though partial bearer establishment fails. The HNB GW knows information about the RAB not established successfully according to the Relocation Request Acknowledge message, and initiates RAB release procedure to the CN. The HNB GW sends a RAB Release Request message to the HNB GW. The other procedure of the RAB Release is the same as the prior art, and will not be described in detail herein.

As another solution (Method 4) of partial RAB being not established successfully, the T-HNB sends the Relocation Request Acknowledge message in block 605 to the HNB GW via RUA Direct Transfer message, even though partial bearer establishment fails. The HNB GW knows information about the RAB not established successfully according to the Relocation Request Acknowledge message. The HNB GW may send a Relocation Required message to the CN (to initiate relocation procedure with the participating of the CN), or the HNB GW may terminate the present relocation procedure by sending a Relocation Preparation Failure message including cause value which is the same as that of the relocation failure to the S-HNB. Optionally, the relocation which uses the participating of the CN may be initiated by the S-HNB.

According to the indication for relocation to be terminated at the HNB GW received from the HNB GW, if the ciphering algorithm or integrity protection algorithm selected by the S-HNB is included in the Relocation Request message received by the T-HNB and supported by the T-HNB, the algorithms may be used by the T-HNB first. If the ciphering algorithm or integrity protection algorithm selected by the S-HNB are not included in the Relocation Request message received by the T-HNB or not supported by the T-HNB, the T-HNB select new algorithms according to the algorithms supported by it and allowed by the Relocation Request message.

Block 605: According to the indication for relocation to be terminated at HNB GW, the T-HNB sends a RANAP Relocation Command message or RANAP Relocation Request Acknowledge message to the HNB GW via a RUA Direct Transfer message.

In the RANAP Relocation Command message, the resource allocated by the T-HNB is included in the information elements of the RAB list which is used to forward data. The HNB GW stores resources allocated by the T-HNB for each RAB, i.e., user plane information, such as transport layer address and Iu transport relationship contained in the RAB list which is used to forward data. After knowing that the UE is relocated successfully, the HNB GW receives data from the CN, and then sends data to the T-HNB according to the resource allocated by the T-HNB.

It is to be noted that, according to the indication for relocation to be terminated at HNB GW, the T-HNB may include allocated RAB parameter values in the RUA Direct Transfer message. Or, according to the indication for relocation to be terminated at HNB GW, the T-HNB does not include allocated RAB parameter values in the RANAP Relocation Command message.

Another implementation of this block may be as follows. The T-HNB may allocate resource for each RAB, such as transport layer address and Iu transport relationship, according to the RANAP Relocation Request message, and further send a RANAP Relocation Request Acknowledge message to the HNB GW via a RUA Direct Transfer message.

Block 606: The HNB GW sends a RANAP Relocation Command message or RANAP Relocation Request Acknowledge message to the S-HNB via a RUA Direct Transfer message.

In this block, for the scheme in block 605, i.e., the T-HNB sends a RANAP Relocation Request Acknowledge message to the HNB GW via a RUA Direct Transfer message, the HNB GW sends the RANAP Relocation Request Acknowledge message to the S-HNB via a RUA Direct Transfer message. Further, the S-HNB forwards data to the T-HNB, according to the allocated resource in the RANAP Relocation Request Acknowledge message.

Blocks 607-610 are the same as blocks 307-310, and will not be described in detail here.

Block 611 may be implemented by one of the following schemes:

Scheme 1:

Block 611a: The T-HNB sends a RANAP Iu Release Command message to the HNB GW via a RUA Direct Transfer message, or the T-HNB sends a RANAP Relocation Complete message to the HNB GW via a RUA Direct Transfer message, according to the indication for relocation to be terminated at HNB GW.

For example, this scheme may be used when the user plane transport between the HNB and the CN employs two tunnels, or the S-HNB decides that the relocation is to be terminated at HNB GW when the user plane transport between the HNB and the CN for the UE employs two tunnels. How the S-HNB knows whether the user plane transport of the UE between the HNB and the CN employs one tunnel or two tunnels is beyond the scope of this disclosure, and will not be described in detail here.

Scheme 2:

Block 611a: The T-HNB sends the RANAP Iu Release Command message or the RANAP Relocation Complete message encapsulated in a RUA Direct Transfer message to the HNB GW.

Block 611b: The HNB GW sends a RANAP Relocation Complete Request message to the CN, when the relocation is to be terminated at HNB GW, or when the relocation is to be terminated at HNB GW and one tunnel is used for UE plane data transport. The message includes new downlink user plane information. The downlink user plane information includes established RAB list. Each piece of RAB information includes a RAB identity, transport layer address and Iu transport relationship. The RAB information also includes allocated RAB parameter values. The RANAP Relocation Complete Request message also includes information elements selected integrity protection algorithm and selected ciphering algorithm. The HNB GW obtains the new downlink user plane information, the selected integrity protection algorithm, and selected ciphering algorithm in block 605. The new downlink user plane information is optional, and may be included when the UE user plane transport employs one tunnel, or may be included when the UE user plane transport employs one tunnel or two tunnels. When the user plane transport employs two tunnels, the RAN information established successfully at the target HNB is told to CN, for example, the RAB which is implied as being not successfully established in the established RAB information is not contained.

Block 611c: The CN sends a RANAP Relocation Complete Response message to the HNB GW, and the RAB information established successfully and RAN information to be released are included in the RANAP Relocation Complete Response message. This block is to be carried out when block 611b is carried out.

The procedure of RANAP Relocation Complete Request/Response in blocks 611b and 611c may be a procedure of existing enhanced relocation complete request/response or may be a new RANAP procedure.

Scheme 3:

The T-HNB sends a message according to whether the relocation is to be terminated at HNB GW. The T-HNB knows whether the relocation uses the participating of the CN or the relocation is to be terminated at HNB GW according to the RUA Connection/Direct Transfer message in block 604. When the relocation uses the participating of the CN, the T-HNB performs block 611a, sending the RANAP Relocation Complete message to the GW via the RUA Direct Transfer message, and then performs block 612. When the relocation is to be terminated at HNB GW, the following blocks may be performed.

Block 611a: The T-HNB sends a RANAP Iu Release Command message or the RANAP Relocation Complete message to the HNB GW via a RUA Direct Transfer message. This block is optional, and may be or may be not performed in Scheme 3.

Block 611d: The T-HNB sends a RANAP Relocation Complete Request message to the HNB GW via a RUA Direct Transfer message. The RANAP Relocation Complete Request message includes new downlink user plane information. The downlink user plane information includes established RAB lists, and each piece of the RAB information includes a RAB identity, transport layer address, and Iu transport relationship, and the RAB information also includes RAB parameters allocated. The RANAP Relocation Complete Request message also includes information elements selected integrity protection algorithm and selected ciphering algorithm. The new downlink user plane information is optional, and may be included when the UE user plane transport employs one tunnel, or may be included when the UE user plane transport employs one tunnel or two tunnels. When the user plane transport employs two tunnels, the RAB information established successfully at the target HNB is told to the CN, for example, the RAB which is implied as being not successfully established in the established RAB information is not contained.

Block 611e: The HNB GW sends a RANAP Relocation Complete Request message to the CN, the information elements included in this message are the same as those of the RANAP message in block 611d.

Block 611f: The CN sends a RANAP Relocation Complete Response message including RAB information established successfully and RAB information to be released to the HNB GW.

Block 611g: The HNB GW sends a RANAP Relocation Complete Response message to the T-HNB, and the information elements included in this message are the same as those of the RANAP message in block 611f.

The procedure in blocks 611d to 611g may be a procedure of existing enhanced relocation complete request/response or may be a new RANAP procedure.

Scheme 4: The T-HNB sends a message according to whether the relocation is to be terminated at the HNB GW and the user plane transport manner of the UE. The T-HNB knows whether the relocation uses the participating of the UE or the relocation is to be terminated at the HNB GW, and knows whether the user plane transport of the UE employs one tunnel or two tunnels, according to the RUA Connection/Direct Transfer message in block 604. The T-HNB performs block 611a, sending the RANAP Relocation Complete message to the GW via the RUA Direct Transfer message, when the relocation uses the participating of the UE, and then performs block 612. The T-HNB performs block 611a, sending a RANAP Iu Release Command or Relocation Complete message to the GW via a RUA Direct Transfer message, when the relocation is to be terminated at HNB GW but the user plane transport of the UE employs two tunnels. When the relocation is to be terminated at HNB GW, and user plane transport employs two tunnels, the T-HNB may use the integrity protection algorithm and the ciphering algorithm selected by the S-HNB, and then performs blocks 612. When the relocation is to be terminated at HNB GW and the user plane transport of the UE employs one tunnel, blocks 611d to 611g are performed, the detailed implementation is the same as that in Scheme 3, and will not be repeated herein.

Scheme 5:

The T-HNB sends a message according to whether the relocation is to be terminated at the HNB GW, the user plane transport manner of the UE, and the content of the Relocation Request message. The T-HNB knows whether the relocation uses the participating of the UE or the relocation is to be terminated at the HNB GW, and knows whether the user plane transport of the UE employs one tunnel or two tunnels, according to the RUA Connection/Direct Transfer message in block 604. The T-HNB performs block 611a, sending the RANAP Relocation Complete message to the GW via the RUA Direct Transfer message, when the relocation uses the participating of the UE, or when the relocation is to be terminated at HNB GW but the user plane transport of the UE employs two tunnels and integrity protection algorithm and ciphering protection information are not included in the Relocation Request message, and then performs block 612. When the relocation is to be terminated at HNB GW, and user plane transport employs two tunnels, and integrity protection algorithm and ciphering protection information are included in the Relocation Request message, the T-HNB selects the security algorithm and ciphering algorithm, and performs blocks 611d to 611g, the implementation of which is the same as that in Scheme 3 and will not be repeated herein. When the relocation is to be terminated at HNB GW and the user plane transport of the UE employs one tunnel, blocks 611d to 611g are performed, the implementation is the same as that in Scheme 3, and will not be repeated herein.

Block 612: The HNB GW sends the RANAP Iu Release Command message to the S-HNB via a RUA Disconnect message.

Blocks 613-614 are the same as blocks 313-314 respectively, and the description will not be repeated.

Thus, the method for relocating the UE according to this embodiment is completed. It can be seen from the above procedure that, the method according to this embodiments provides the same advantages as Embodiment 2. This embodiment differs from Embodiment 2 in that whether the relocation is to be terminated at HNB GW is decided by S-HNB according to this embodiment and is decided by HNB GW according to Embodiment 2.

Embodiment 5

Figure 7:
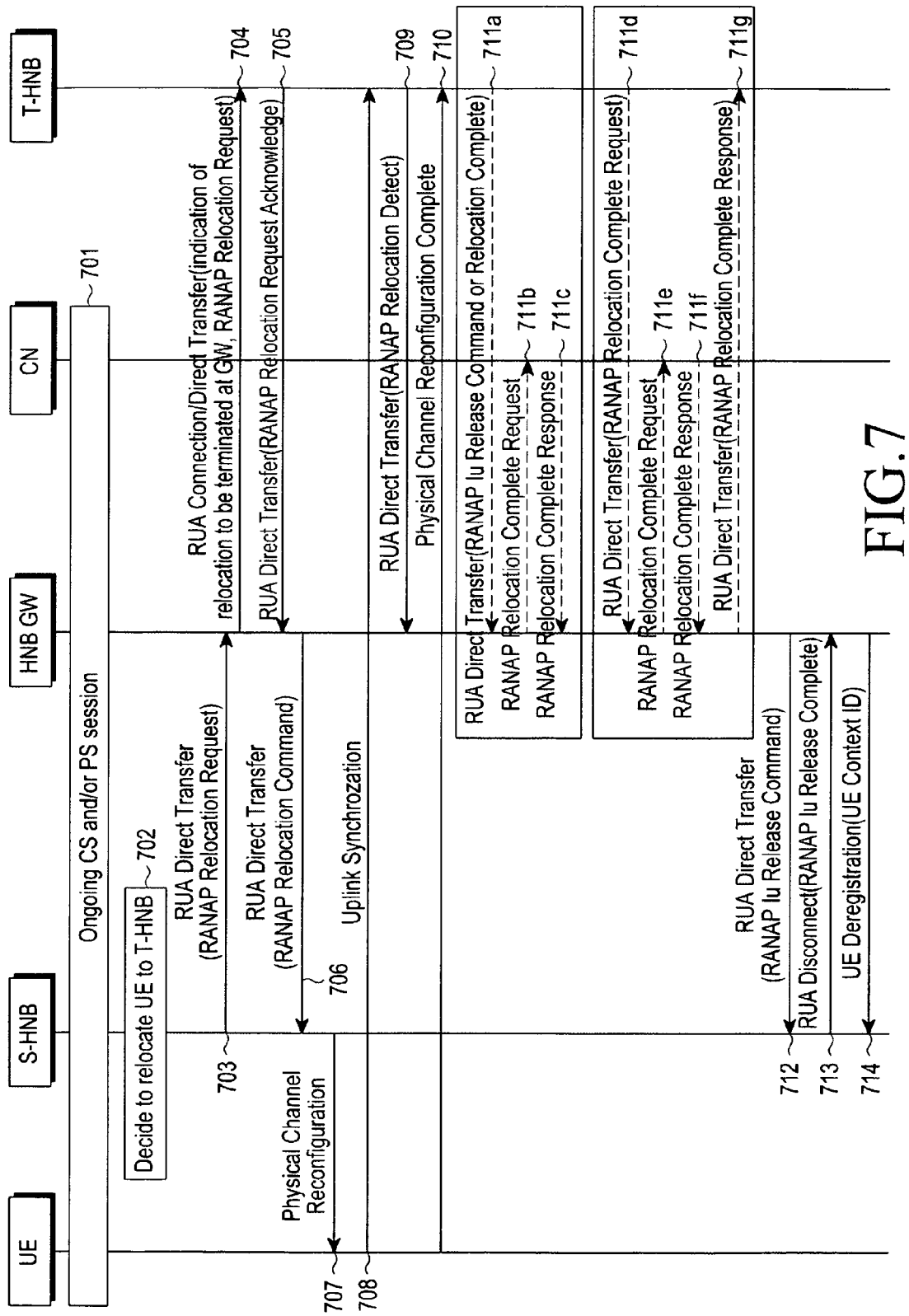
FIG. 7 illustrates a method for relocating UE according to Embodiment 5 of the present invention.

Similar to Embodiment 4, in this embodiment, whether the relocation is to be terminated at HNB GW is decided by the S-HNB. The procedure of the method according to this embodiment is shown in FIG. 7. As shown in FIG. 7, this procedure differs from the procedure shown in FIG. 6 in blocks 705 and 706, and the other blocks are the same as those of FIG. 6, which will not be repeated here.

Block 705: The T-HNB sends a RANAP Relocation Request Acknowledge message to the HNB GW via a RUA Direct Transfer message.

Block 706: The HNB GW constructs a RANAP Relocation Command message, and sends the RANAP Relocation Command message to the S-HNB by encapsulating it in a RUA Direct Transfer message.

Thus, the method for relocating the UE according to this embodiment is completed.

Embodiment 6

Figure 8:
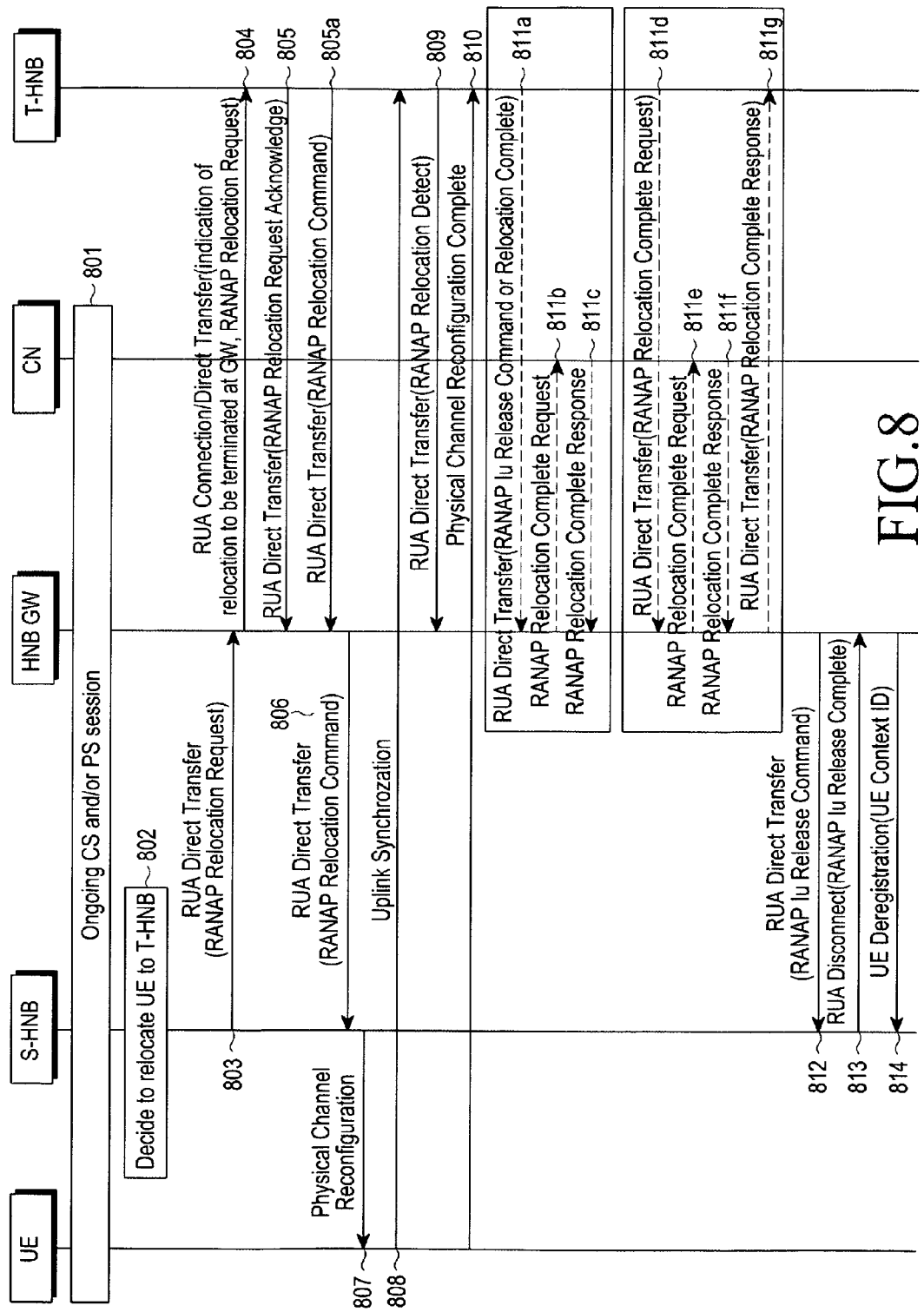
FIG. 8 illustrates a method for relocating UE according to Embodiment 6 of the present invention.

Similar to Embodiments 4 and 5, in this embodiment, whether the relocation is to be terminated at HNB GW is decided by the S-HNB. The procedure of the method according to this embodiment is shown in FIG. 8. As shown in FIG. 8, this procedure differs from the procedure shown in FIG. 6 in blocks 805 and 806, and the other blocks are the same as those of FIG. 6, thus the description will not be repeated here.

Block 805: The T-HNB sends a RANAP Relocation Request Acknowledge message to the HNB GW via a RUA Direct Transfer message.

Block 805a: According to the indication for relocation to be terminated at HNB GW, the T-HNB constructs a RANAP Relocation Command message, and sends the RANAP Relocation Command message to the HNB GW via a RUA Direct Transfer message.

Block 806: The HNB GW sends a RANAP Relocation Command message to the S-HNB via a RUA Direct Transfer message.

Thus, the method for relocating the UE according to this embodiment is completed.

Embodiment 7

Figure 9:
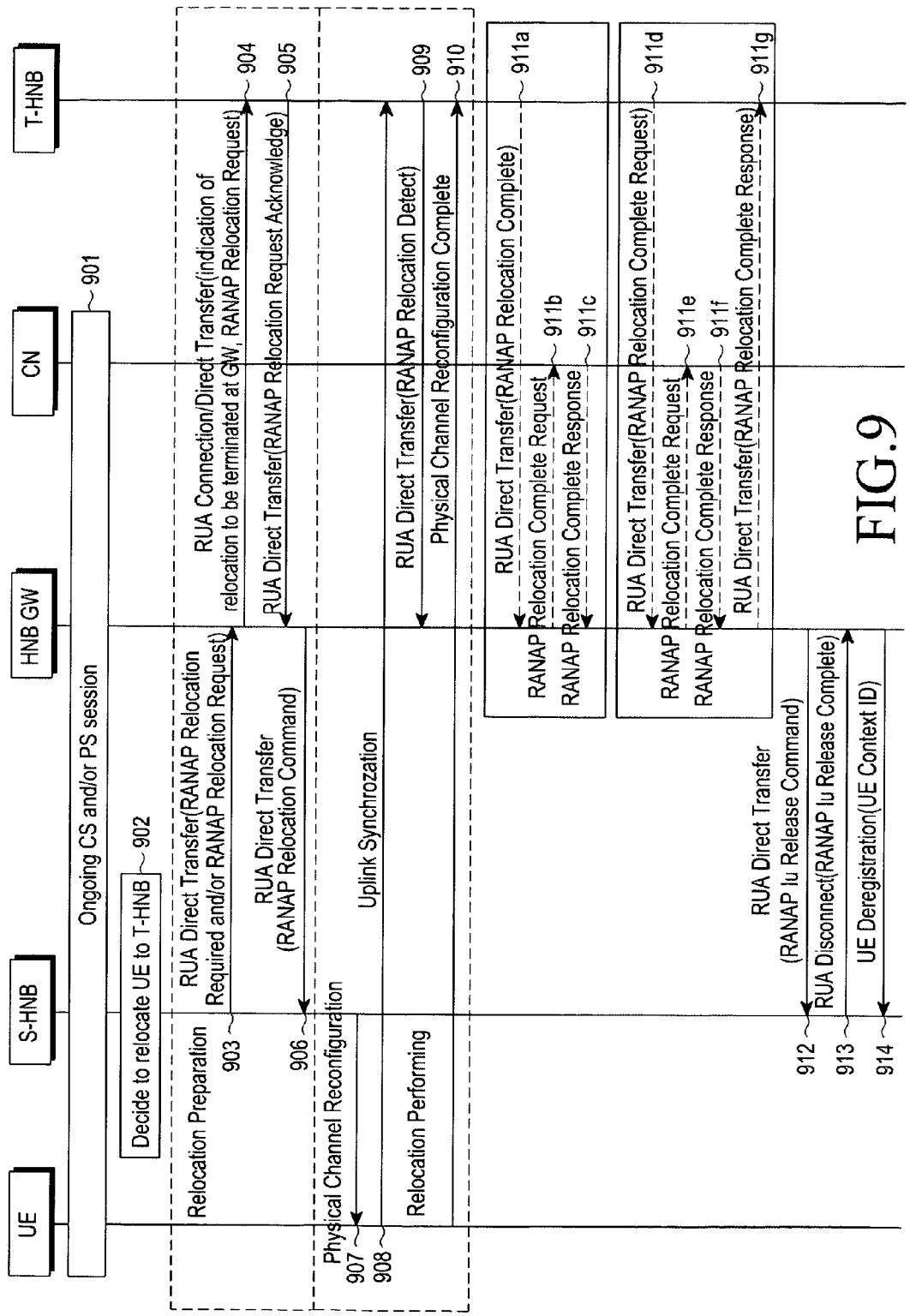
FIG. 9 illustrates a method for relocating UE according to Embodiment 7 of the present invention.

This embodiment focuses on how the HNB GW informs the T-HNB the manner of relocation, so that the T-HNB sends correct message to the HNB GW in the relocation complete stage. The detailed procedure of the method according to this embodiment is shown in FIG. 9. As shown in FIG. 9, the procedure includes the blocks that follow.

Block 901: UE establishes an active CS and/or PS session to CN via an S-HNB and an HNB-GW.

Block 902: The S-HNB makes a decision to relocate the UE performing the CS and/or PS session.

Block 903: The S-HNB sends a RANAP Relocation Request and/or a RANAP Relocation Required message to the HNB-GW by using, but not limited to, the following schemes:

Scheme 1:

the S-HNB sends a RANAP Relocation Required message to the HNB GW via a RUA. If relocation is to be terminated at HNB GW (for example, the relocation is under a same GW in a same CSG), the GW constructs a RANAP Relocation Request message according the UE context information stored therein. In this scheme, the GW stores UE context information, such as information of each RAB of the UE and UE security context information.

Scheme 2:

The S-HNB sends a Relocation Required message to the HNB GW via a RUA message. RAB information of the UE and security related information are included in the RUA message. Iu UP (user plane) information may be also included in the RUA information. In the RUA information, the following information of the UE may also be included:
International Mobile Subscriber Identification (IMSI)
UE Aggregate Maximum Bit Rate (AMBR)
CSG membership status
Shared Network Area (SNA) access information
UE Specific Behavior Information-Iu (UESBI-$I_U$)
CN MBMS connection information (MBMS bearer service information elements added by UE, such as temporary mobile group identity TMGI and point-to-point RAB identity)

If the relocation is to be terminated at HNB GW (for example, the relocation is under a same HNB GW in a same CSG), the GW constructs a RANAP Relocation Request message according to received UE Context information.

Scheme 3:

The S-HNB sends a RANAP Relocation Request message to the HNB GW via a RUA message.

Scheme 4:

The S-HNB sends a RANAP Relocation Required message or a RANAP Relocation Request message to the HNB GW via a RUA message.

It is to be noted that RAB data amount report information elements, indicating S-HNB downlink data amount of the RAB not sent successfully, are also included in the RUA Direct Transfer message.

It is to be noted that, in the RUA Direct Transfer message, integrity protection algorithm selected by the S-HNB may be also included, and ciphering algorithm selected by the S-HNB may be also included.

Block 904: The HNB GW sends a RANAP Relocation Request message to the T-HNB via a RUA Connection message and a RUA Direct Transfer message. An indication for relocation to be terminated at HNB GW is further included in the RUA Connection message or in the RUA Direct Transfer message. Information about whether the user plane transport of the UE employs one tunnel or two tunnels may be further included in the RUA Connection message or in the RUA Direct Transfer message.

Data amount may be reported using the following two methods:

Method 1:

It is to be noted that the RAB data amount report information elements, indicating S-HNB downlink data amount of the RAB not sent successfully, are further included in the RUA Direct Transfer message or in the RUA Connection message. The T-HNB accumulates the received downlink data amount not sent successfully. When the UE session is released, the accumulated downlink RAB data amount not sent successfully is reported by the T-HNB to the GW, and then to the CN.

Method 2:

The HNB GW accumulates RAB data amount report information received from each HNB during the mobility procedure. When the UE session is released, the RAB data amount is reported by the HNB GW, such as via an Iu Release Complete message, to the CN.

It is to be noted that the HNB GW sends the selected integrity protection algorithm received from the S-HNB to the T-HNB via a RUA Direct Transfer message or a RUA Connection message. Ciphering algorithm selected by the S-HNB may be further included in the RUA message.

Blocks 905 to 910 may be the same as blocks 305 to 310 and the description will not be repeated herein.

Block 911 may be performed as follows.

Scheme 1:

Block 911a: The T-HNB sends a RANAP Relocation Complete message encapsulated in a RUA Direct Transfer message to the HNB GW.

For example, this scheme may be used when the user plane transport between the HNB and the CN employs two tunnels, or when the relocation is determined to be terminated at HNB GW when the UE user plane transport between the HNB and CN employs two tunnels.

Scheme 2:

Block 911a: The T-HNB sends a RANAP Relocation Complete message encapsulated in a RUA Direct Transfer message to the HNB GW.

Block 911b: The HNB GW sends a RANAP Relocation Complete Request message to the CN, when the relocation is to be terminated at HNB GW, or when the relocation is to be terminated at HNB GW and one tunnel is used for UE plane data transport. The message includes new downlink user plane information. The downlink user plane information includes established RAB list. Each piece of RAE information includes a RAB identity, transport layer address and Iu transport relationship. The RAB information may also include allocated RAB parameter values. The RANAP Relocation Complete Request message also includes information elements selected integrity protection algorithm and selected ciphering algorithm. The HNB GW obtains the new downlink user plane information, the selected integrity protection algorithm, and selected ciphering algorithm in block 905. The new downlink user plane information is optional, and may be included when the UE user plane transport employs one tunnel, or may be included when the UE user plane transport employs one tunnel or two tunnels. When the user plane transport employs two tunnels, the RAN information established successfully at the target HNB is told to CN, for example, the RAB which is implied as being not successfully established in the established RAB information is not contained.

Block 911c: The CN sends a RANAP Relocation Complete Response message to the HNB GW, and the RAB information established successfully and RAN information to be released are included in the RANAP Relocation Complete Response message. This block is to be carried out when block 911b is carried out.

The procedure of blocks 911b and 911c may be a procedure of existing enhanced relocation complete request/response or may be a new RANAP procedure.

Scheme 3:

The T-HNB sends a message according to whether the relocation is to be terminated at HNB GW. The T-HNB knows whether the relocation uses the participating of the CN or the relocation is to be terminated at HNB GW according to the RUA Connection/Direct Transfer message in block 904. When the relocation uses the participating of the CN, the T-HNB performs block 911a, sending the RANAP Relocation Complete message to the GW via the RUA Direct Transfer message, and then performs block 912. When the relocation is to be terminated at HNB GW, the following blocks may be performed.

Block 911d: The T-HNB sends a RANAP Relocation Complete Request message to the HNB GW via a RUA Direct Transfer message. The RANAP Relocation Complete Request message includes new downlink user plane information. The downlink user plane information includes established RAB lists, and each piece of the RAB information includes a RAB identity, transport layer address, and Iu transport relationship, and the RAB information also includes RAB parameters allocated. The RANAP Relocation Complete Request message also includes information elements, selected integrity protection algorithm, and selected encryption algorithm. The new downlink user plane information is optional, and may be included when the UE user plane transport employs one tunnel, or may be included when the UE user plane transport employs one tunnel or two tunnels. When the user plane transport employs two tunnels, the RAB information established successfully at the target HNB is told to the CN, for example, the RAB which is implied as being not successfully established in the established RAB information is not contained.

Block 911e: The HNB GW sends a RANAP Relocation Complete Request message to the CN, the information elements included in this message are the same as those of the RANAP message in block 911d.

Block 911f: The CN sends a RANAP Relocation Complete Response message including RAB information established successfully and RAB information to be released to the HNB GW.

Block 911g: The HNB GW sends a RANAP Relocation Complete Response message to the T-HNB, and the information elements included in this message are the same as those of the RANAP message in block 911f.

The procedure in blocks 911d to 911g may be a procedure of existing enhanced relocation complete request/response or may be a new RANAP procedure.

Scheme 4:

The T-HNB sends a message according to whether the relocation is to be terminated at the HNB GW and the user plane transport manner of the UE. The T-HNB knows whether the relocation uses the participating of the UE or the relocation is to be terminated at the HNB GW, and knows whether the user plane transport of the UE employs one tunnel or two tunnels, according to the RUA Connection/Direct Transfer message in block 904. The T-HNB performs block 911a, sending the RANAP Relocation Complete message to the GW via the RUA Direct Transfer message, when the relocation uses the participating of the UE, or when the relocation is to be terminated at HNB GW but the user plane transport of the UE employs two tunnels. When the relocation is to be terminated at HNB GW, and user plane transport employs two tunnels, the T-HNB may use the integrity protection algorithm and the ciphering algorithm selected by the S-HNB. When the relocation is to be terminated at HNB GW and the user plane transport of the UE employs one tunnel, blocks 911d to 911g are performed, the detailed implementation is the same as that in Scheme 3, and the description will not be repeated herein.

Scheme 5:

The T-HNB sends a message according to whether the relocation is to be terminated at the HNB GW, the user plane transport manner of the UE, and the content of the Relocation Request. The T-HNB knows whether the relocation uses the participating of the UE or the relocation is to be terminated at the HNB GW, and knows whether the user plane transport of the UE employs one tunnel or two tunnels, according to the RUA Connection/Direct Transfer in block 904. The T-HNB performs block 911a, sending the RANAP Relocation Complete message to the GW via the RUA Direct Transfer message, when the relocation uses the participating of the UE, or when the relocation is to be terminated at HNB GW but the user plane transport of the UE employs two tunnels and integrity protection algorithm and ciphering protection information are not included in the Relocation Request message. When the relocation is to be terminated at HNB GW, and user plane transport employs two tunnels, and integrity protection algorithm and ciphering protection information are included in the Relocation Request message, the T-HNB selects the security algorithm and ciphering algorithm, and perform blocks 911d to 911g, the implementation of which is the same as that in Scheme 3 and the description will not be repeated herein. When the relocation is to be terminated at HNB GW and the user plane transport of the UE employs one tunnel, blocks 911d to 911g are performed, the implementation is the same as that in Scheme 3, and the description will not be repeated herein.

Blocks 912 to 914 may be the same as blocks 312 to 314 respectively, and the description will not be repeated.

Thus, the method for relocating the UE according to this embodiment is completed.

Embodiment 8

Figure 10:
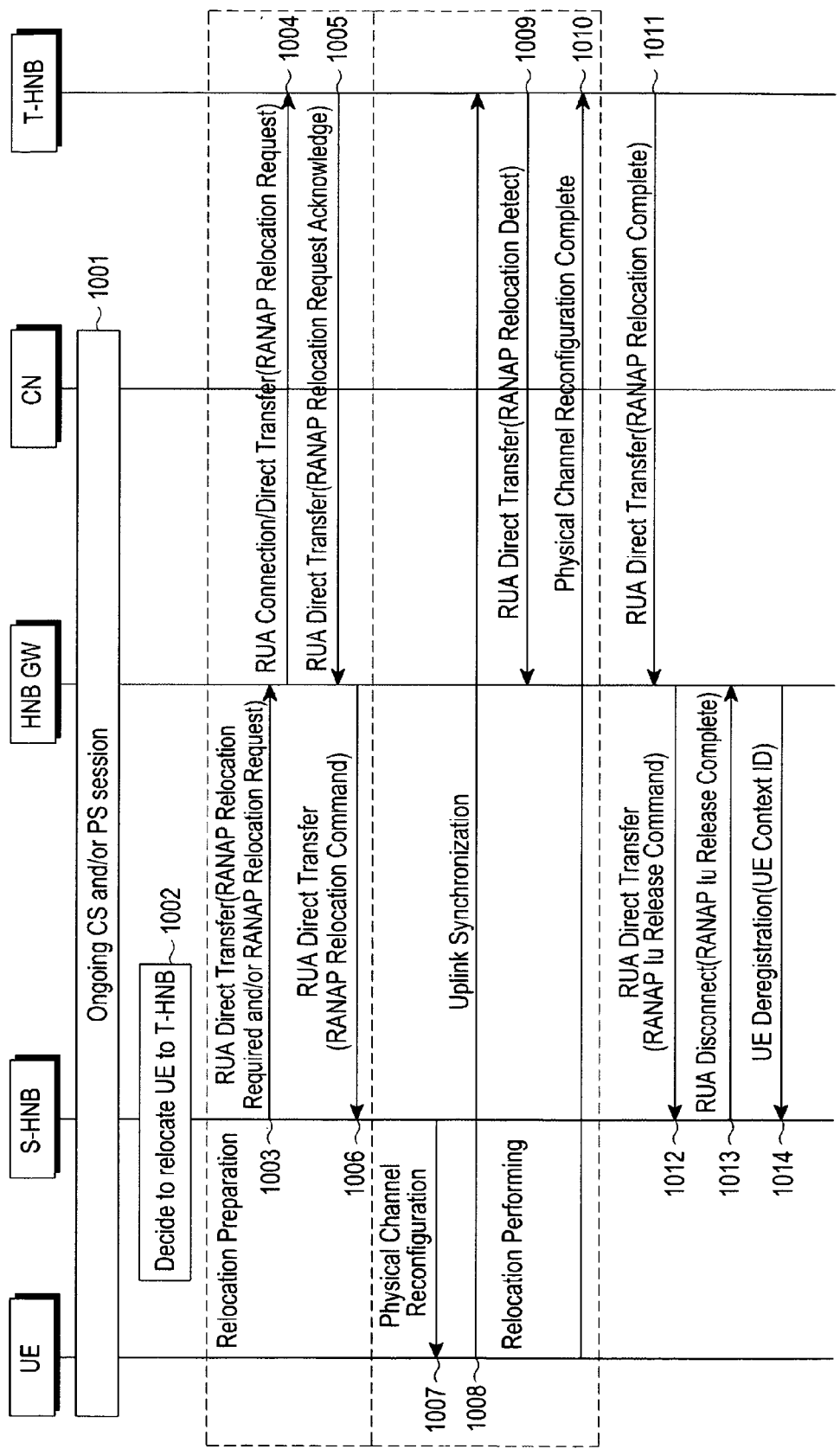
FIG. 10 illustrates a method for relocating UE according to Embodiment 8 of the present invention.

This embodiment focuses on how to inform the T-HNB by the HNB GW the relocation manner, so as to perform different procedure at the T-HNB or to send correct message by the T-HNB to the HNB GW in the Relocation Complete stage. The detailed procedure of the method according to this embodiment is shown in FIG. 10. As shown in FIG. 10, the procedure includes the blocks as follows:

Blocks 1001 to 1003 are the same as blocks 901 to 903, and the description will not be repeated herein.

Block 1004: The HNB GW sends a RANAP Relocation Request message to the T-HNB via a RUA Connection message or a RUA Direct Transfer message. An indication for relocation to be terminated at HNB GW is further included in the RUA Connection message or in the RUA Direct Transfer message. Information about whether the user plane transport of the UE employs one tunnel or two tunnels may be further included in the RUA Connection message or in the RUA Direct Transfer message.

The data amount may be reported using the following two methods:

Method 1:

It is to be noted that, the RAB data amount report information elements, indicating S-HNB downlink data amount of the RAB not sent successfully, are further included in the RUA Direct Transfer message or in the RUA Connection message. The T-HNB accumulates the received downlink data amount not sent successfully. When the UE session is released, the accumulated downlink RAB data amount not sent successfully is reported by the T-HNB to the GW, and then to the CN.

Method 2:

The HNB GW accumulates RAB data amount report information received from each HNB during the mobility procedure. When the UE session is released, the RAB data amount is reported by the HNB GW, such as via an Iu Release Complete message, to the CN.

It is to be noted that, the HNB GW sends the selected integrity protection algorithm received from the S-HNB to the T-HNB via a RUA Direct Transfer message or a RUA Connection message. A ciphering algorithm selected by the S-HNB may be further included in the RUA message.

The T-HNB allocates resources using the RAB parameters included in the Relocation Request message according to the indication for relocation to be terminated at HNB GW received from the HNB GW. Even though the received Relocation Request message also includes some alternative RAB parameters of RAB, the T-HNB does not use the alternative RAB parameters to allocate the resources. If the allocation of the resources according to the RAB parameters is not successful, the T-HNB sends a Relocation Failure message to the HNB GW. The T-HNB may include the cause of the failure (RAB parameter resource not allowed) in the Relocation Failure message, and sends it to the HNB GW. If there are alternative RAB parameters, the HNB GW may send Relocation Required message to the CN (to initiate the relocation that uses the participating of the CN). Or, the HNB GW terminates the present relocation procedure by sending a Relocation Preparation Failure message including the cause value which is the same as that of the relocation failure to the S-HNB. Optionally, the S-HNB may initiate a relocation procedure that uses the participating of the CN.

If the resource is allocated successfully, the T-HNB, after the relocation is completed, may initiate a procedure to amend the RAB to the CN to modify the Qos parameter.

As a solution (Method 1) of partial RAB being not established successfully, according to the indication for relocation to be terminated at HNB GW received from the HNB GW, the T-HNB sends a Relocation Failure message to the HNB GW when partial RAB is not established successfully. The T-HNB may include the cause of the failure (partial bearer establishment fails) in the Relocation Failure message and send it to the HNB GW. The HNB GW may send a Relocation Required message to the CN (to initiate relocation procedure with the participating of the CN), or the HNB GW may terminate the present relocation procedure by sending a Relocation Preparation Failure message including cause value which is the same as that of the relocation failure to the S-HNB. Optionally, the relocation which uses the participating of the CN may be initiated by the S-HNB.

As another solution (Method 2) of partial RAB being not established successfully, the T-HNB sends the Relocation Request Acknowledge message in block 605 to the HNB GW via RUA Direct Transfer message, even though partial bearer establishment fails. According to the indication for relocation to be terminated at the HNB GW, the T-HNB initiates RAB Release procedure to the CN. The T-HNB sends a RAB Release Request message to the HNB GW. The other procedure of the RAB Release is the same as the prior art, and will not be described in detail herein.

As another solution (Method 3) of partial RAB being not established successfully, the T-HNB sends the Relocation Request Acknowledge message in block 1005 to the HNB GW via RUA Direct Transfer message, even though partial bearer establishment fails. The HNB GW knows information about the RAB not established successfully according to the Relocation Request Acknowledge message, and initiates RAB release procedure to the CN. The HNB GW sends a RAB Release Request message to the HNB GW. The other procedure of the RAB Release is the same as the prior art, and will not be described in detail herein.

As another solution (Method 4) of partial RAB being not established successfully, the T-HNB sends the Relocation Request Acknowledge message in block 1005 to the HNB GW via RUA Direct Transfer message, even though partial bearer establishment fails. The HNB GW knows information about the RAB not established successfully according to the Relocation Request Acknowledge message. The HNB GW may send a Relocation Required to the CN (to initiate relocation procedure with the participating of the CN), or the HNB GW may terminate the present relocation procedure by sending a Relocation Preparation Failure message including cause value which is the same as that of the relocation failure to the S-HNB. Optionally, the relocation which uses the participating of the CN may be initiated by the S-HNB.

According to the indication for relocation to be terminated at the HNB GW received from the HNB GW, if ciphering algorithm or integrity protection algorithm selected by the S-HNB is included in the Relocation Request message received by the T-HNB and supported by the T-HNB, the algorithms may be used by the T-HNB first. If ciphering algorithm or integrity protection algorithm selected by the S-HNB is not included in the Relocation Request message received by the T-HNB or not supported by the T-HNB, the T-HNB selects new algorithms according to the algorithms supported by it and allowed by the Relocation Request message.

Block 1005: The T-HNB sends a RANAP Relocation Request Acknowledge message encapsulated in the RUA Direct Transfer message to the HNB GW.

It is to be noted that, when the relocation is to be terminated at HNB GW, if partial bearer establishment fails, as a solution of the present invention, the HNB GW initiates a procedure to release failure bear to the CN. The HNB GW sends RAB Release Request to the CN. As another solution of the present invention, the HNB GW sends Relocation Preparation Failure message to the S-HNB. The HNB GW may include corresponding cause of failure (partial bearer establishment failure) in the Relocation Preparation Failure message and send it to the S-HNB. Optionally, the relocation which uses the participating of the CN may be initiated by the S-HNB.

If selected integrity protection algorithm or ciphering algorithm is included in the Relocation Request Acknowledge message received by the HNB GW, the HNB GW detects whether the algorithms selected by the T-HNB are allowed algorithms. If not, the HNB GW terminates the relocation procedure by sending a Relocation Preparation Failure message to the S-HNB.

Block 1006 to block 1010 are the same as block 906 to block 910, and the description will not be repeated herein.

Block 1011: the T-HNB sends a RANAP Relocation Complete message to the HNB GW via a RUA Direct Transfer message.

Blocks 1012 to 1014 may be the same as blocks 312 to 314, and the description will not be repeated herein.

Thus, the method for relocating the UE according to this embodiment is completed.

Embodiment 9

Figure 11:
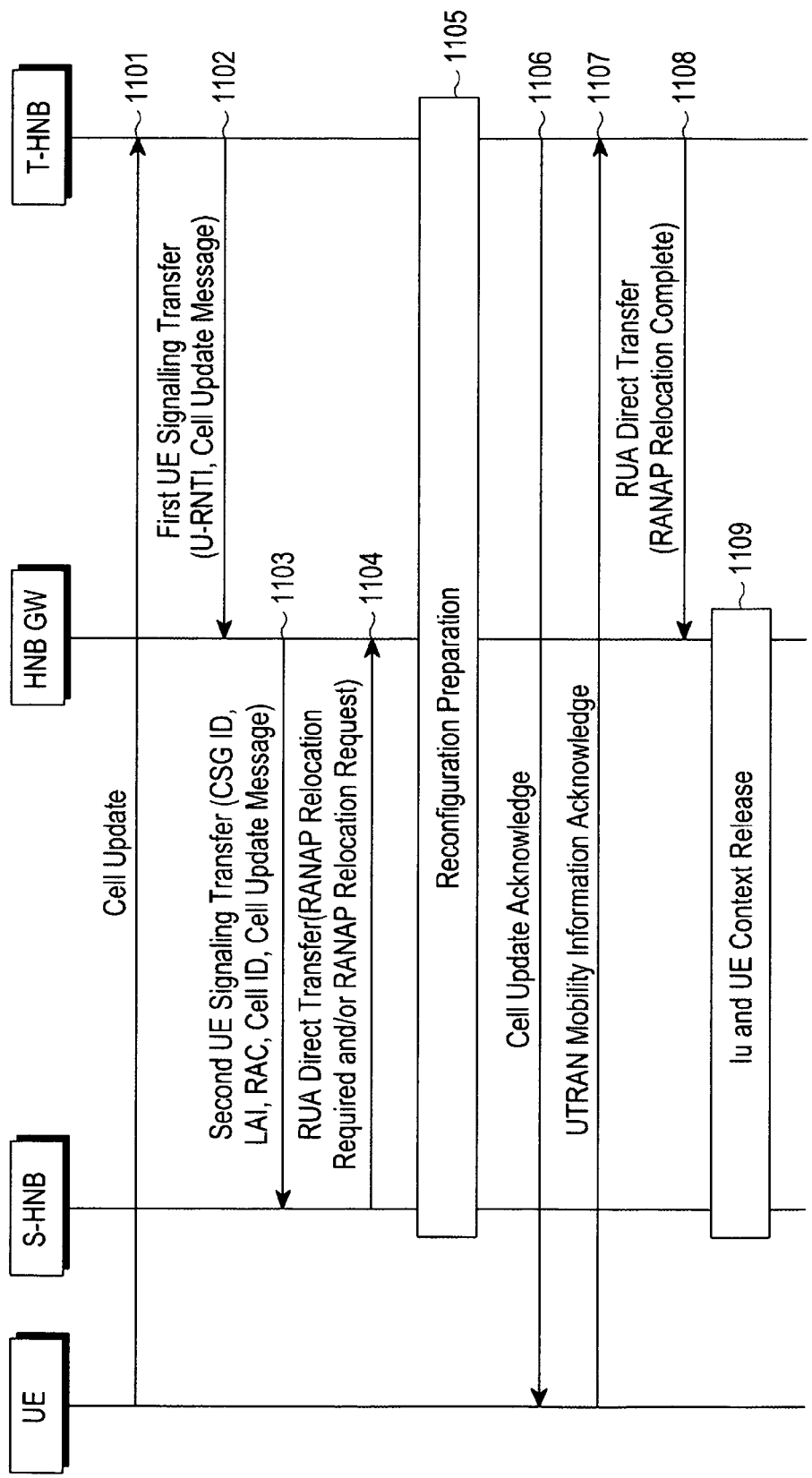
FIG. 11 illustrates a method for relocating UE in Cell_FACH status according to Embodiment 9 of the present invention.

FIG. 11 is a flow chart illustrating the method for relocating UE in a Cell_FACH state according to Embodiment 9 of the present invention. The access control according to the present invention is the same as the above relocation procedure, i.e., the access control is determined by the S-HNB or determined by the HNB GW forwardly (the HNB GW receives Relocation Required or Relocation Request from the S-HNB).

Block 1101: the T-HNB receives a Cell Update message from the UE.

Block 1102: The T-HNB sends a first UE Signaling Transfer message to the HNB GW. The first UE Signaling message includes Radio network Temporary Identity of the UE (U-RNTI) and Cell Update message.

Block 1103: the HNB GW finds UE context information according to the U-RNTI, and forwards the Cell Update message to the S-HNB via a second UE Signaling Transfer message. The second UE Signaling Transfer message includes the Location Area Identity (LAI) of the target cell where the UE is, the Route Area Code (RAC), the Cell identity of the target cell, or the CSG identity of the target cell.

Block 1104: The S-HNB performs the access control of the UE according to the CSG identity received from the HNB GW, such as determine whether the relocation procedure is between the source cell and target cell having the same CSG identity. In the situation that the UE can access, the S-HNB sends a RANAP Relocation Required and/or Relocation Request message to the HNB GW via RUA Direct Transfer message. The CSG identity is included in the RANAP Relocation Required or in the Relocation Request. The RANAP Relocation Required includes LAI, RAC, RNC identity, and identity of the target cell received from the HNB GW.

It is to be noted that the HNB GW may perform access control of the UE according to the CSG identity of the target cell, such as determine whether the relocation is in a same CSG.

In block 1105, the other relocation preparation procedure is performed. For example, the HNB GW sends a Relocation Request message to the T-HNB, and the T-HNB sends a Relocation Request Acknowledge message to the HNB GW, which are not the key point of the present invention, and will not be described in detail herein.

Block 1106: The T-HNB sends a Cell Update Acknowledge message to the UE.

Block 1107: The UE sends a UTRAN Mobile Information Acknowledge to the T-HNB.

Block 1108: The T-HNB sends a RANAP Relocation Complete message to the HNB GW via RUA Direct Transfer.

Block 1109: UE context of the S-HNB and Iu Signaling connection between the S-HNB and the HNB GW are released.

Thus, the method for relocating the UE according to this embodiment is completed.

Embodiment 10

Figure 12:
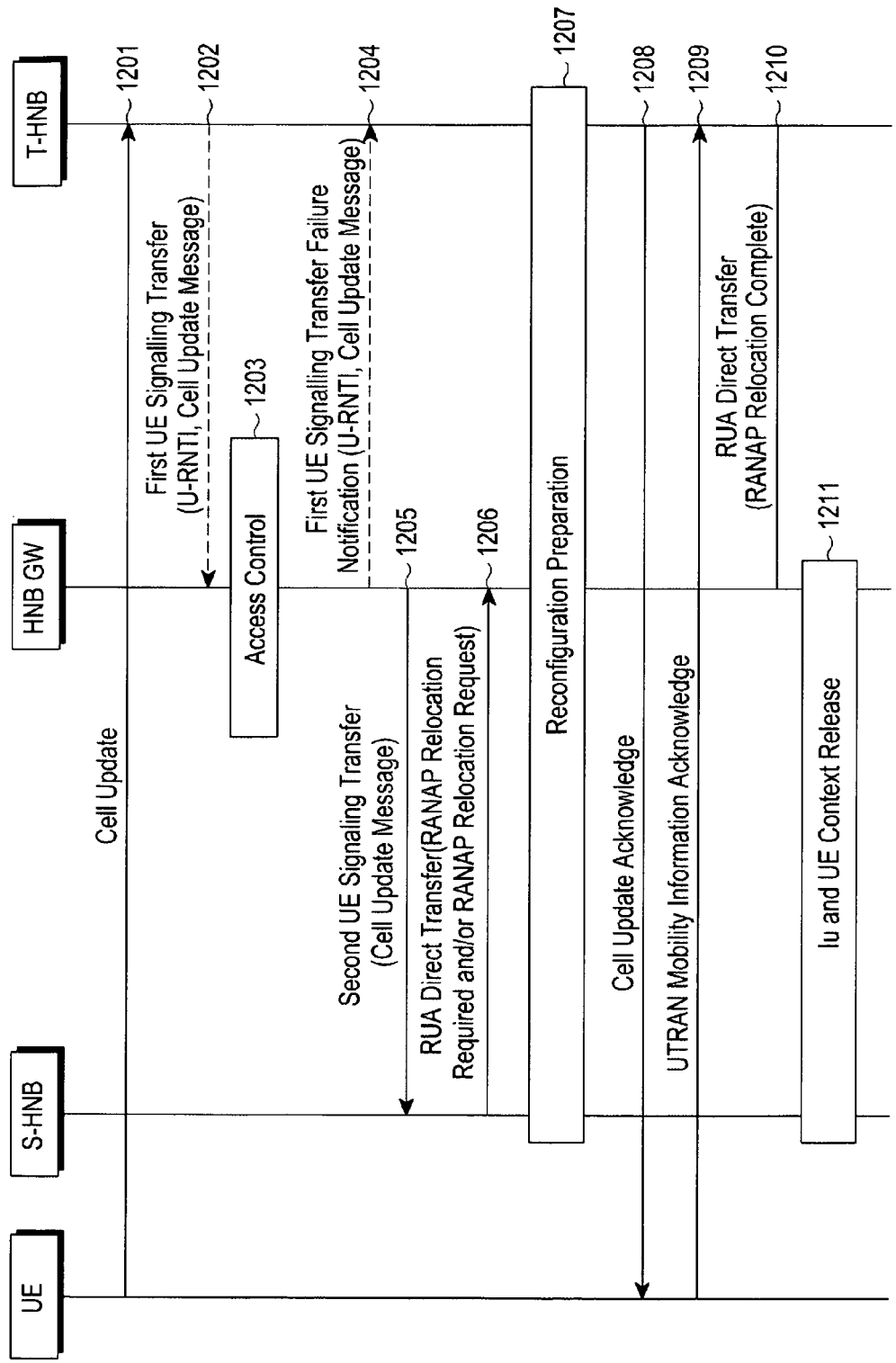
FIG. 12 illustrates a method for relocating UE in Cell_FACH status according to Embodiment 10 of the present invention.

FIG. 12 is a flow chart illustrating a method for relocating UE in a Cell_FACH state according to Embodiment 10 of the present invention. The access control according to the present embodiment is performed by the HNB GW backward (the HNB GW receives UE Signaling Transfer message from the T-HNB).

Blocks 1201 and 1202 are the same as blocks 1101 and 1102, and the description will not be repeated herein.

Block 1203: The HNB GW finds UE context according to the U-RNTI, and performs access control to the UE according to the access modes of the S-HNB cells and T-HNB cells and/or CSG identity, determines whether the UE can access the target cell. For example, if both the source cell and the target cell are Open Access cells, or both the source cell and the target cell are CSG cells and have a same CSG identity, or both the source cell and the target cell are Hybrid cell and have a same CSG identity, then the UE can access the target cell. If the T-HNB does not support CSG, the HNB GW performs the access control of the UE according to the IMSI of the UE.

If the access control fails, block 1204 is performed; the HNB GW sends a first UE Signaling Transfer Failure Notification message to the T-HNB. The first UE Signaling Transfer Failure Notification message includes the U-RNTI of the UE, Cell Update message. The Cell Update message includes cause of failure, such as the target cell is not allowed to be accessed, or the relocation is not supported.

Block 1205: The HNB GW sends the second UE Signaling Transfer message to the S-HNB. The second UE Signaling Transfer message includes cell update information, and may also includes LAI of the T-HNB, RAC, and cell identity of the target cell. This block is performed when the access control succeed.

Block 1206: The S-HNB sends a Relocation Required and/or Relocation Request message to the HNB GW via RUA Direct Transfer. The Relocation Required includes LAI, RAC, RNC identity, identity of the target cell received from the HNB GW. The CSG identity may be not included in the Relocation Required or the Relocation Request message by the S-HNB (even though the target cell is a CSG cell), since forward access control is not needed.

Blocks 1207-1211 are the same as blocks 1105-1109, and the description will not be repeated herein.

Thus, the method for relocating the UE according to this embodiment is completed.

To sum up, according to an embodiment, a RANAP Relocation Request message is sent by an S-HNB to an HNB GW, so that it is not necessary for the HNB GW to store a large amount of the UE context information, thereby reducing the burden of the HNB. According to an embodiment, the interaction with the CN is decreased during the relocation procedure, thereby reducing the burden of the CN. According to an embodiment, a message associated with RANAP relocation from an HNB GW to an S-HNB is constructed by a T-HNB, so that the construction of the message associated with the RANAP relocation is not performed by the HNB GW, thereby reducing the complexity of the HNB GW. According to an embodiment, in the relocation complete stage, after receiving a Relocation Complete Request from the T-HNB, the HNB GW sends a Relocation Complete Request message to the CN to notify the CN the change of the downlink user plane bear transfer path. According to an embodiment, the indication for relocation to be terminated at the HNB GW included in the RUA Direct Transfer message or the RUA Connection message received by the T-HNB includes various optimized relocation messages, and thus the T-HNB can allocate resources by not using alternative RAB parameters, or use first the integrity protection algorithm and ciphering algorithm selected by the S-HNB, or send various optimized relocation command such as a Relocation Failure message when partial bearer establishment fails, so that the problems of Qos guarantee negotiation, partial bearer establishment failure and security algorithms selection in the optimized relocation procedure can be solved. According to an embodiment, the mobility problem of UE in Cell_FACH state could also be solved.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for relocating User Equipment (UE) by a Home Node B Gateway (HNB GW) in a communication system, the method comprising:
   receiving a Radio Access Network Application Part (RANAP) Relocation Request message from a Source Home Node B (S-HNB);
   transmitting the RANAP Relocation Request message to a target HNB (T-HNB);
   receiving a RANAP Relocation Request Acknowledge message from the T-HNB;
   constructing a RANAP Relocation Command message and transmitting the constructed RANAP Relocation Command message to the S-HNB;
   receiving a RANAP Relocation Complete message from the T-HNB; and
   constructing, by the HNB GW, a RANAP Iu Release Command message and transmitting the constructed RANAP Iu Release Command message to the S-HNB,
   wherein both the S-HNB and the T-HNB are directly connected to the HNB GW.

2. The method of claim 1, further comprising:
   after transmitting the RANAP Relocation Request message to the T-HNB, receiving at least one of the RANAP Relocation Command message and the RANAP Relocation Request Acknowledge message from the T-HNB;
   transmitting at least one of the RANAP Relocation Command message and the RANAP Relocation Request Acknowledge message to the S-HNB; and
   receiving at least one of the RANAP Relocation Complete message and a RANAP Iu Release Command message from the T-HNB.

3. The method of claim 2, wherein the RANAP Relocation Request message, the RANAP Relocation Request Acknowledge message, the RANAP Relocation Command message, the RANAP Relocation Complete message, and the RANAP Iu Release Command message are transmitted or received via a RANAP User Adaptation (RUA) Direct Transfer message, and the RANAP Relocation Request message transmitted to the T-HNB is transmitted via the RUA Direct Transfer message and a RUA Connection message.

4. The method of claim 2, further comprising:
   after transmitting the RANAP Relocation Command message to the S-HNB, receiving the RANAP Relocation Complete message or a RANAP Iu Release Command message from the T-HNB via a RANAP User Adaptation (RUA) Direct Transfer message; and
   transmitting one of: the RANAP Iu Release Command message encapsulated in a RUA Direct Transfer message to the S-HNB, and the RANAP Iu Release Command message to the S-HNB directly via a RUA Direct Transfer message.

5. The method of claim 1, wherein the RANAP Relocation Request message, the RANAP Relocation Request Acknowledge message, the RANAP Relocation Command message, and the RANAP Relocation Complete message are transmitted or received by encapsulating in a RANAP User Adaptation (RUA) Direct Transfer message, and the RANAP Relocation Request message transmitted to the T-HNB is transmitted by encapsulating in the RUA Direct Transfer message and a RUA Connection message.

6. The method of claim 1, wherein the RANAP Relocation Request message, the RANAP Relocation Request Acknowledge message, the RANAP Relocation Command message, the RANAP Relocation Complete message, and the RANAP Iu Release Command message are transmitted or received by encapsulating in a RANAP User Adaptation (RUA) Direct Transfer message, and the RANAP Relocation Request message transmitted to the T-HNB is transmitted by encapsulating in the RUA Direct Transfer message and a RUA Connection message.

7. A method for relocating User Equipment (UE) by a Home Node B Gateway (HNB GW) in a communication system when the UE is in a Cell forward Access Channel (Cell_FACH) state, the method comprising:
   receiving a first UE Signaling Transfer message from a target Home Node B (T-HNB);
   transmitting a Cell Update message and a second UE Signaling Transfer message to a Source HNB (S-HNB), the second UE Signaling Transfer message comprising a Location Area Identity (LAI) of a target cell where the UE is, a Route Area Code (RAC), a cell identity of the target cell, and a Closed Subscriber Group (CSG) identity of the target cell; and
   receiving at least one of a Radio Access Network Application Part (RANAP) Relocation Required message and a RANAP Relocation Request message from the S-HNB.

8. The method of claim 7, further comprising:
   performing access control of the UE according to an access mode of T-HNB cells, and
   when the access control of the UE fails, receiving a first UE signaling Transfer Failure Notification message,
   wherein the first UE Signaling Transfer Failure Notification message comprises a Cell Update message.

9. The method of claim 7, further comprising:
   after receiving the first UE Signaling Transfer message, performing access control of the UE according to an access mode of T-HNB cells.

10. The method of claim 7, wherein the RANAP Relocation Request message is transmitted or received by encapsulating in a RANAP User Adaptation (RUA) Direct Transfer message.

11. A Home Node B Gateway (HNB GW) configured to relocate User Equipment (UE) in a communication system, the HNB GW comprising:
   a receiver configured to:
     receive a Radio Access Network Application Part (RANAP) Relocation Request message from a Source Home Node B (S-HNB),
     receive a RANAP Relocation Request Acknowledge message from a target HNB (T-HNB), and
     receive a RANAP Relocation Complete message from the T-HNB;
   a transmitter configured to transmit the RANAP Relocation Request message to the T-HNB, transmit a RANAP Relocation Command message to the S-HNB, and transmit a RANAP Iu Release Command message to the S-HNB; and
   a controller configured to construct the RANAP Relocation Command message and construct the RANAP Iu Release Command message,
   wherein both the S-HNB and the T-HNB are directly connected to the HNB GW.

12. The HNB GW of claim 11, wherein the receiver receives at least one of the RANAP Relocation Command message and the RANAP Relocation Request Acknowledge message from the T-HNB, and receives at least one of the RANAP Relocation Complete message and a RANAP Iu Release Command message from the T-HNB, and
   wherein the transmitter transmits at least one of the RANAP Relocation Command message and the RANAP Relocation Request Acknowledge message to the S-HNB.

13. The HNB GW of claim 12, wherein the RANAP Relocation Request message, the RANAP Relocation Request Acknowledge message, the RANAP Relocation Command message, the RANAP Relocation Complete message, and the RANAP Iu Release Command message are transmitted or received via a RANAP User Adaptation (RUA) Direct Transfer message, and the RANAP Relocation Request message transmitted to the T-HNB is transmitted via the RUA Direct Transfer message and a RUA Connection message.

14. The HNB GW of claim 12, wherein the receiver receives the RANAP Relocation Complete message or a RANAP Iu Release Command message from the T-HNB via a RANAP User Adaptation (RUA) Direct Transfer message, and wherein the transmitter transmits one of: the RANAP Iu Release Command message encapsulated in a RUA Direct Transfer message to the S-HNB, and the RANAP Iu Release Command message to the S-HNB directly via a RUA Direct Transfer message.

15. The HNB GW of claim 13, wherein the RANAP Relocation Request message, the RANAP Relocation Request Acknowledge message, the RANAP Relocation Command message, and the RANAP Relocation Complete message are transmitted or received by encapsulating in a RANAP User Adaptation (RUA) Direct Transfer message, and the RANAP Relocation Request message transmitted to the T-HNB is transmitted by encapsulating in the RUA Direct Transfer message and a RUA Connection message.

16. The HNB GW of claim 13, wherein the RANAP Relocation Request message, the RANAP Relocation Request Acknowledge message, the RANAP Relocation Command message, the RANAP Relocation Complete message, and the RANAP Iu Release Command message are transmitted or received by encapsulating in a RANAP User Adaptation (RUA) Direct Transfer message, and the RANAP Relocation Request message transmitted to the T-HNB is transmitted by encapsulating in the RUA Direct Transfer message and a RUA Connection message.

17. A Home Node B Gateway (HNB GW) configured to relocate User Equipment (UE) in a communication system when the UE is in a Cell forward Access Channel (Cell_FACH) state, the HNB GW comprising:

a receiver configured to receive a first UE Signaling Transfer message from a target Home Node B (T-HNB), and receive at least one of: a Radio Access Network Application Part (RANAP) Relocation Required message and a RANAP Relocation Request message from a Source HNB;

a transmitter configured to transmit a Cell Update message and a second UE Signaling Transfer message to the S-HNB, the second UE Signaling Transfer message comprising a Location Area Identity (LAI) of a target cell where the UE is, a Route Area Code (RAC), a cell identity of the target cell, and a Closed Subscriber Group (CSG) identity of the target cell; and a controller configured to initiate the relocation procedure of the UE by receiving at least one of: the RANAP Relocation Required message and the RANAP Relocation Request message.

18. The T-HNB of claim 17, wherein the controller performs access control of the UE according to an access mode of T-HNB cells, and when the access control of the UE fails, the transmitter transmits a first UE Information Transfer Failure Notification message, wherein the first UE Signaling Transfer Failure Notification message comprises a Cell Update message.

19. The HNB GW of claim 17, wherein the controller perform access control of the UE according to an access mode of T-HNB cells.

20. The HNB GW of claim 17, wherein the RANAP Relocation Request message is transmitted or received by encapsulating in a RANAP User Adaptation (RUA) Direct Transfer message.

* * * * *